US 6,748,302 B2

(12) United States Patent
Kawazoe

(10) Patent No.: US 6,748,302 B2
(45) Date of Patent: Jun. 8, 2004

(54) LANE TRACKING CONTROL SYSTEM FOR VEHICLE

(75) Inventor: Hiroshi Kawazoe, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/042,225

(22) Filed: Jan. 11, 2002

(65) Prior Publication Data
US 2002/0095246 A1 Jul. 18, 2002

(30) Foreign Application Priority Data
Jan. 18, 2001 (JP) ........................................ 2001-010650

(51) Int. Cl.[7] ............................................... G05D 1/00
(52) U.S. Cl. ............................... 701/1; 701/28; 701/41; 701/301; 340/937
(58) Field of Search ................................. 701/1, 28, 23, 701/44, 27, 41, 300, 301; 348/113, 118, 119; 382/148; 340/905, 995, 904, 937

(56) References Cited

U.S. PATENT DOCUMENTS 5,122,957 A * 6/1992 Hattori ............................ 701/1
5,414,625 A * 5/1995 Hattori ............................ 701/1
5,448,487 A * 9/1995 Arai ................................ 701/1
5,963,148 A * 10/1999 Sekine et al. ............... 340/905
6,185,492 B1 * 2/2001 Kagawa et al. .............. 701/41
6,477,260 B1 * 11/2002 Shimomura ................ 382/106
6,577,334 B1 * 6/2003 Kawai et al. ............... 348/148

FOREIGN PATENT DOCUMENTS

JP 11-296660 10/1999
JP 11-348696 12/1999

* cited by examiner

Primary Examiner—Richard M. Camby
(74) Attorney, Agent, or Firm—Foley & Lardner LLP

(57) ABSTRACT

A lane tracking control system for a vehicle includes a controller which is coupled to a road image detector for taking a view ahead of the vehicle, a vehicle behavior detector for detecting a behavior of the vehicle and a steering control mechanism for executing a steering control in response to a steering control signal. The controller is arrange to calculate a road shape on the basis of the view taken by the road image detector, to determine on the basis of the road shape and the vehicle behavior detected by the vehicle behavior detector whether the vehicle tends to depart from a lane traveled by the vehicle, and to output the steering control signal to the steering control mechanism so as to control the vehicle behavior at a desired behavior when the vehicle tends to depart from the lane.

20 Claims, 22 Drawing Sheets

LANE TRACKING CONTROL SYSTEM FOR VEHICLE

BACKGROUND OF THE INVENTION

The present invention relates to a system and method for supporting a lane tracking travel of a vehicle, and more particularly to a lane tracking control system which determines whether a vehicle tends to depart from a lane according to a vehicle traveling condition on the lane and which controls a lane departure distance or time when the vehicle departs from the lane.

Japanese Patent Provisional Publication No. 11-348697 discloses a lane tracking control system which is arranged to generate alarm when the vehicle departs from a traveling lane.

SUMMARY OF THE INVENTION

However, this earlier control system generates alarm with little margin time when a vehicle travels a curved road and when a driver is not steering the vehicle. This little margin time is not sufficient for the driver to execute a steering operation for correcting a traveling locus of the vehicle so as to travel the vehicle within the traveling lane.

It is therefore an object of the present invention to provide a lane tracking control system which accurately detects a lane departure tendency of the vehicle and which controls the vehicle so as to ensure a margin time during when a driver easily executes a steering operation for correcting a traveling locus of the vehicle.

An aspect of the present invention resides in a lane tracking control system for a vehicle, which comprises a road image detector taking a view ahead of the vehicle; a vehicle behavior detector detecting a behavior of the vehicle; a steering control mechanism executing a steering control in response to a steering control signal; and a controller coupled to the road image sensor, the vehicle behavior detector and the steering control mechanism. The controller is arranged to calculate a road shape on the basis of the view taken by the road image detector, to determine whether the vehicle tends to depart from a lane traveled by the vehicle, on the basis of the road shape and the vehicle behavior detected by the vehicle behavior detector, and to output the steering control signal to the steering control mechanism to control the vehicle behavior at a desired behavior when the vehicle tends to depart from the lane.

Another aspect of the present invention resides in a method for tracking a lane traveled by a vehicle, which comprises a step of taking a view ahead of the vehicle; a step of detecting a behavior of the vehicle; a step of calculating a road shape on the basis of the view taken by the road image detector, a step of determining whether the vehicle tends to depart from the lane traveled by the vehicle, on the basis of the road shape and the vehicle behavior; and a step of outputting a control signal to a steering control mechanism for steering the vehicle to control the vehicle behavior at a desired behavior when the vehicle tends to depart from the lane.

DETAILED DESCRIPTION OF THE INVENTION

Referring to FIGS. 1 to 14, there is shown a first embodiment of a lane tracking control system S according to the present invention.

Figure 1:
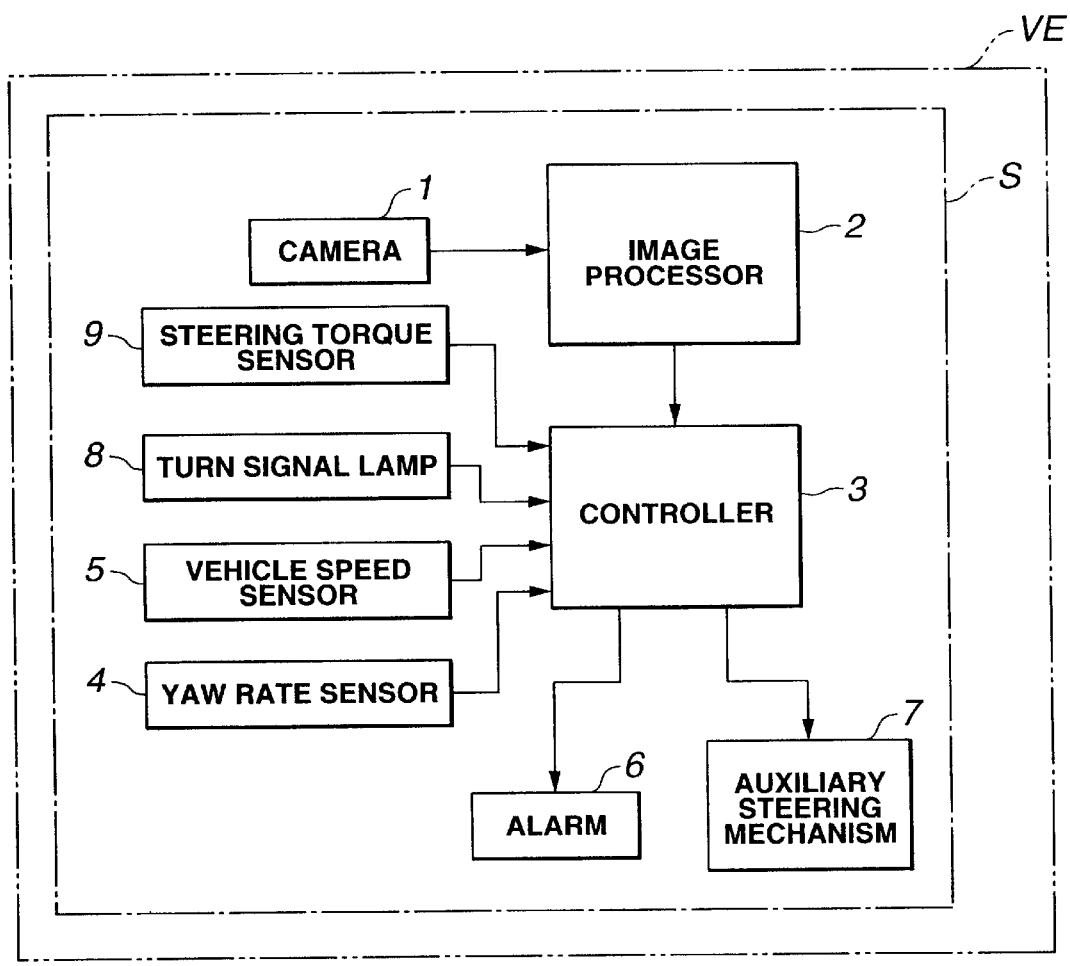
FIG. 1 is a schematic view showing a first embodiment of a lane-keeping support system according to the present invention.

As shown in FIG. 1, the lane tracking control system S is installed to a vehicle VE and comprises a CCD camera 1, an image processor 2, a controller 3, a yaw rate sensor 4, a vehicle speed sensor 5, an alarm 6, an auxiliary steering mechanism 7, a turn signal lamp 8 and a steering torque sensor 9.

Figure 2:
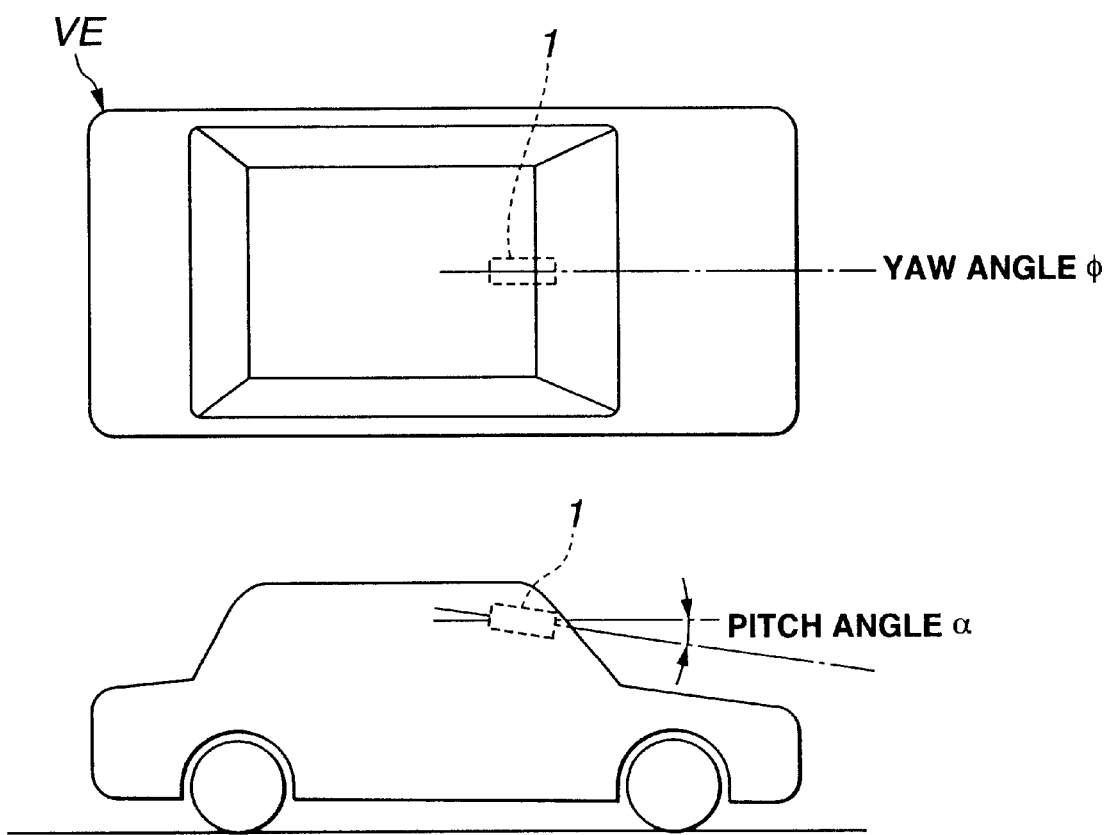
FIG. 2 is an explanatory view showing an installation position of a camera employed in the system of FIG. 1.

CCD camera 1 is installed in a passenger compartment of vehicle VE. More specifically, camera 1 is installed at an upper and laterally center position near a front window as shown in FIG. 2 so that a yaw angle φ between an optical axis of a lens of camera 1 and a longitudinal center axis of vehicle VE is zero and a pitch angle between the optical axis and the horizontal axis of vehicle VE is α. Camera 1 takes an image of a road view ahead of vehicle VE. Image processor 2 is coupled to camera 1 and receives data of the image taken by camera 1. Image processor 2 processes the image in order to detect lane markers of a lane traveled by vehicle VE and sends the processed image data to controller 3.

Controller 3 transforms a shape of lane markers into a mathematical model by using a plurality of parameters representative of the road shape and a vehicle behavior. By updating the parameters so as to correspond the detection result of the lane markers with model lane markers, controller 3 detects and recognizes the lane markers. On the basis of a present real yaw rate $\theta_{REAL}$ detected by a yaw rate sensor 4 and a vehicle speed V detected by a vehicle speed sensor 5, controller 3 detects a lane departure condition of vehicle VE. When vehicle VE is approaching the lane marker and will cross the lane marker, that is, when vehicle VE tends to depart from the lane, controller 3 operates an alarm 6. Alarm 6 gives a warning to a driver by generating warning sound or displaying warning information.

Figure 3:
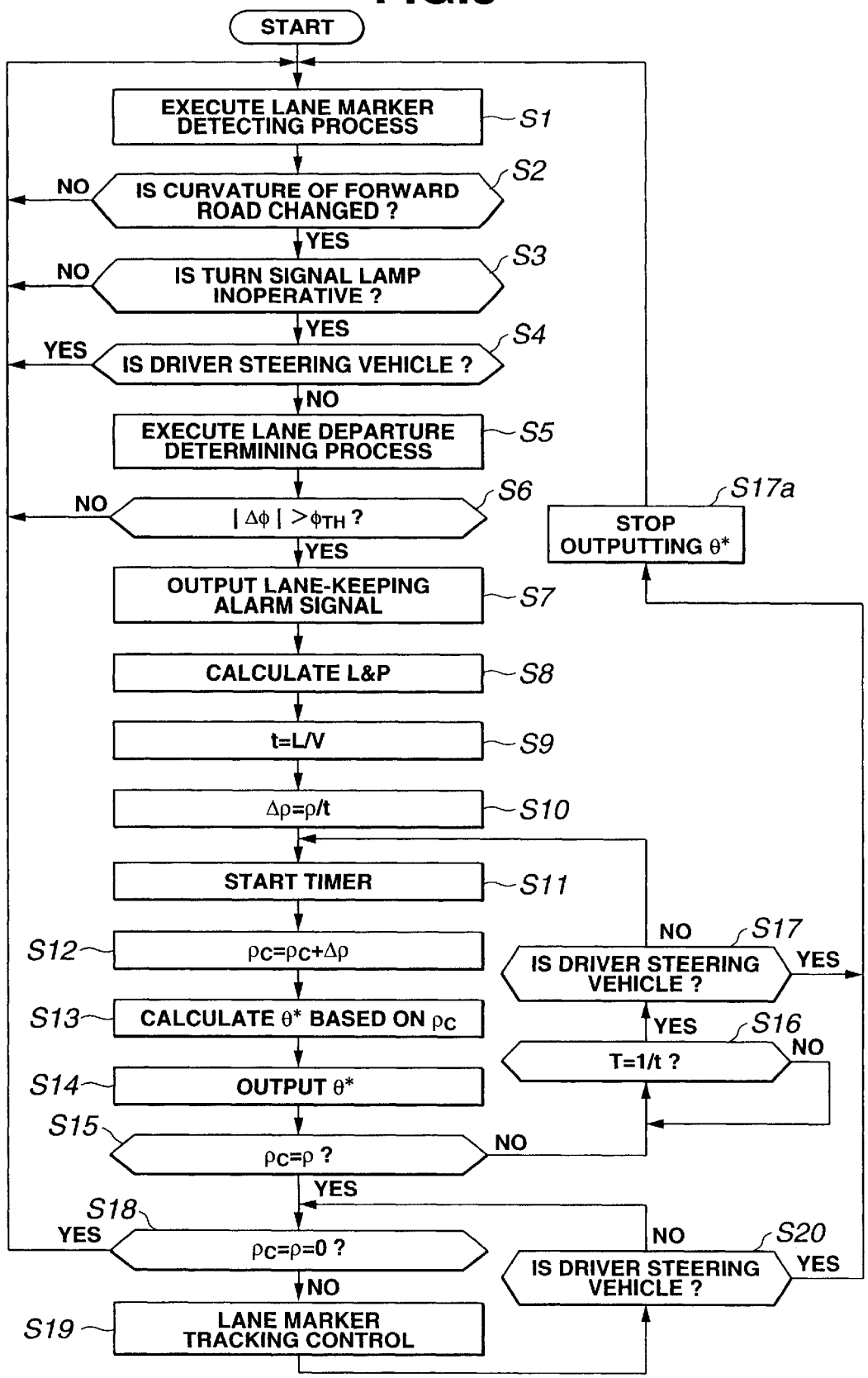
FIG. 3 is a flowchart showing a lane tracking control process employed in the first embodiment.

A flowchart of FIG. 3 shows a procedure of a lane tracking control process executed by controller 3.

At step S1, controller 3 executes a lane marker detecting process for detecting lane markers of a road ahead of the vehicle VE.

At step S2, controller 3 determines whether or not a curvature of the road ahead of vehicle VE is changing. More specifically, controller 3 checks whether or not the road ahead of vehicle VE changes from a straight road to a curved road or from a curved road to a straight road. When the determination at step S2 is affirmative, the routine proceeds to step S3. When the determination at step S2 is negative, the routine returns to step S1.

At step S3, controller 3 determines whether or not a turn signal lamp is inoperative. When the determination at step S3 is negative, that is, when the turn signal lamp is operative, the routine returns to step S1. When the determination at step S3 is affirmative, that is, when the turn signal lamp is inoperative, the routine proceeds to step S4.

At step S4, controller 4 determines whether or not a driver is steering vehicle VE. The determination is executed by determining whether a steering torque detection value TQ detected by steering torque sensor 9 is greater than or equal to a threshold $T_{TH}$. When $TQ \geq T_{TH}$, controller 3 determines that the driver is steering vehicle VE by controlling a steering wheel, and therefore the routine returns to step S1. When $TQ < T_{TH}$, controller 3 determines that the driver does not intend to steer vehicle VE, and the routine proceeds to step S5.

At step S5, controller 3 executes a lane departure predicting process wherein controller 3 calculates a target yaw rate $\phi_{NEED}$ on the basis of the lane marker information detected at step S1, and calculates a yaw rate difference Δφ between target yaw rate $\phi_{NEED}$ and a real yaw rate $\phi_{REAL}$ detected by yaw rate sensor 4, in order to determine whether vehicle VE tends to depart from the lane.

At step S6, controller 3 determines whether an absolute value |Δφ| of yaw rate difference Δφ is greater than a threshold $\Delta\phi_{TH}$. When $|\Delta\phi| > \Delta\phi_{TH}$, controller 3 determines that there is a tendency of the lane departure, and the routine proceeds to step S7. When $|\Delta\phi| \leq \Delta\phi_{TH}$, controller 3 determines that there is no tendency of the lane departure, and the routine returns to step S1. The threshold $\Delta\phi_{TH}$ is a previously set value obtained as a result of various experiments, as a value that if vehicle VE travels at the real yaw rate $\phi_{REAL}$ which generates the absolute value |Δφ| greater than threshold $\Delta\phi_{TH}$, vehicle VE will depart from the lane.

At step S7, controller 3 outputs a lane departure alarm signal to alarm 6 to generate alarm of to display alarm information.

Figure 14:
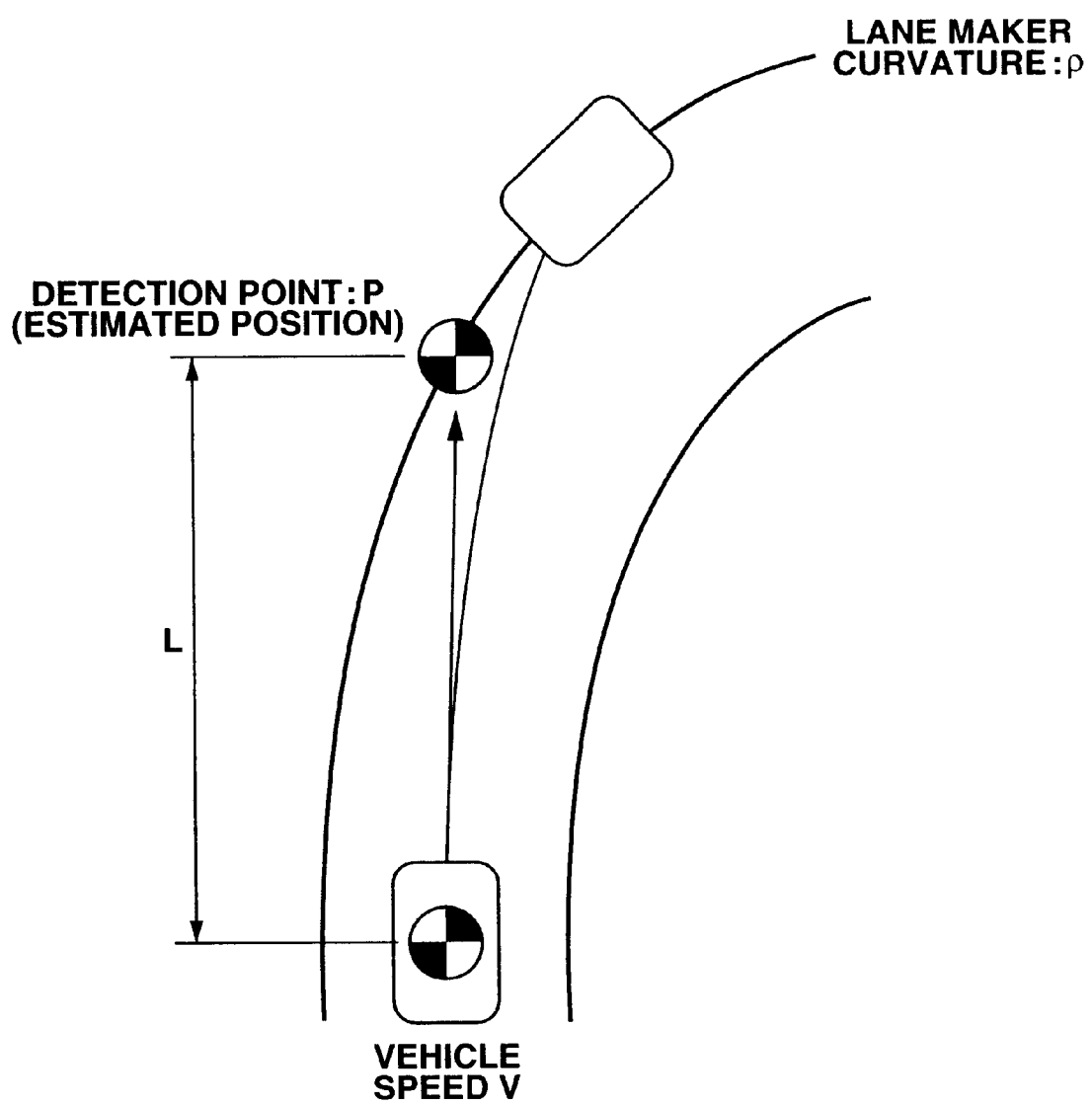
FIG. 14 is a view employed for explaining the lane tracking operation of the first embodiment.

At step S8, controller 3 calculates a lane departure distance L from vehicle VE to a point P and a lane marker curvature (road curvature) ρ at a lane departure point P shown in FIG. 14. More specifically, controller 3 calculates lane-departure distance L from vehicle VE to an intersection P corresponding to lane departure point P between one of lane markers estimated from road parameters a to e corrected at step S1 and a turn locus of vehicle VE which locus is calculated on the basis of real yaw rate $\phi_{REAL}$ and calculates a lane marker curvature ρ at the lane departure point P.

At step S9, controller 3 calculates a lane departure time period t on the basis of lane departure distance L and vehicle speed V and the following equation (1).

$$t = L/V \quad (1)$$

At step S10, controller 3 calculates an updating value Δρ by dividing lane-marker curvature ρ by lane-departure time period t (Δρ=ρ/t). This updating value Δρ is employed for updating a controlled curvature $\rho_c$ functioning as a steering control parameter.

At step S11, controller 3 starts a control interval timer for counting a control interval of this routine.

At step S12, controller 3 updates the controlled curvature $\rho_c$ by adding the updating value Δρ to the present controlled curvature $\rho_c$ ($\rho = \rho_c + \Delta\rho$).

At step S13, controller 3 calculates a target auxiliary steering angle θ* on the basis of the calculated controlled curvature $\rho_c$ and a direction of the curve of the road.

At step S14, controller 3 outputs target auxiliary steering angle θ* to auxiliary steering mechanism 7 in order to execute the steering control for bringing auxiliary steering angle θ closer to target auxiliary steering angle θ*.

At step S15, controller 3 determines whether or not controlled curvature $\rho_c$ corresponds to the road curvature ρ. When the determination at step S15 is negative ($\rho_c \neq \rho$), the routine proceeds to step S16.

At step S16, subsequent to the negative determination at step S15, controller 3 determines whether or not a timer value T of the control interval timer reaches a value 1/t obtained by dividing 1 by lane-departure time t. When the determination at step S16 is negative (T<1/t), the routine repeats to step S16 until time value T reaches the value 1/t (T=1/t). When the determination at step S16 is affirmative (T≧1/t), the routine proceeds to step S17.

At step S17, controller 3 determines whether or not a driver is steering vehicle VE as is similar to the execution at step S4. When the determination at step S17 is affirmative, that is, when the driver is steering vehicle VE, the routine proceeds to step S17a wherein controller 3 stops outputting target auxiliary steering angle θ* to auxiliary steering mechanism 7. After the execution of step S17a, the routine returns to step S1. When the determination at step S17 is negative, the routine returns to step S11.

On the other hand, when the determination at step S15 is affirmative ($\rho_c=\rho$), the routine proceeds to step S18.

At step S18, controller 3 determines whether both controlled curvature $\rho_c$ and lane curvature $\rho$ are equal to zero or not. Since this step S18 is executed subsequent to the affirmative determination at step S15, basically controlled curvature $\rho_c$ is equal to lane curvature $\rho$. When the determination at step S18 is negative ($\rho_c \neq \rho \neq 0$), the routine proceeds to step S19 wherein controller 3 executes the lane-marker tracking steer control for adjusting controlled curvature $\rho_c$ at road curvature $\rho$, as is similar to the process executed at steps S13 and S14.

At step S20 subsequent to the execution of step S19, controller 3 determines whether or not a driver is steering vehicle VE as is similar to the execution at step S4 or S17. When the determination at step S20 is affirmative, that is, when the driver is steering vehicle VE, the routine proceeds to step S17a wherein controller 3 stops outputting target auxiliary steering angle θ* to auxiliary steering mechanism 7. When the determination at step S20 is negative, the routine returns to step S18.

Figure 4:
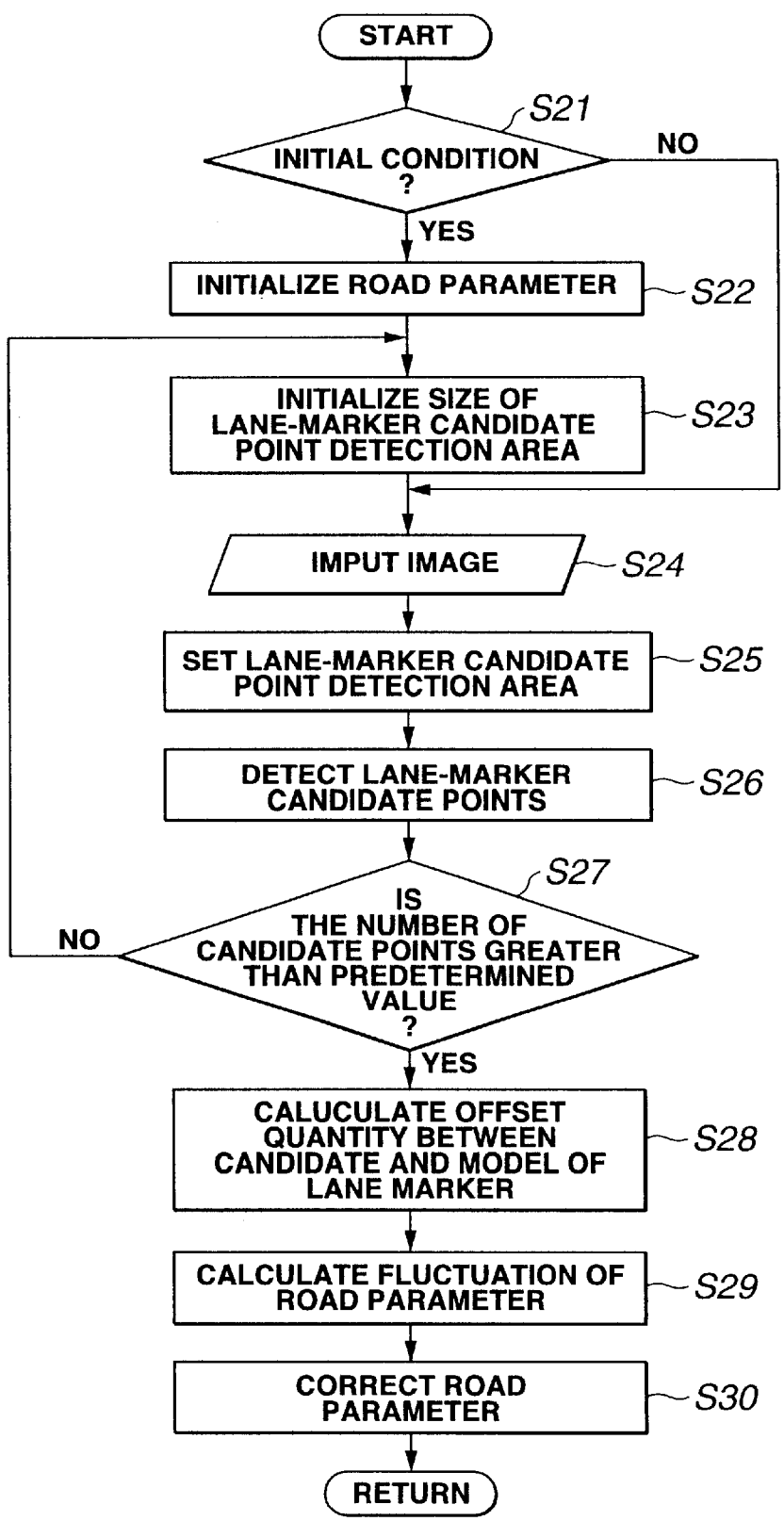
FIG. 4 is a flowchart showing a lane marker detecting process employed in the first embodiment.
Figure 5:
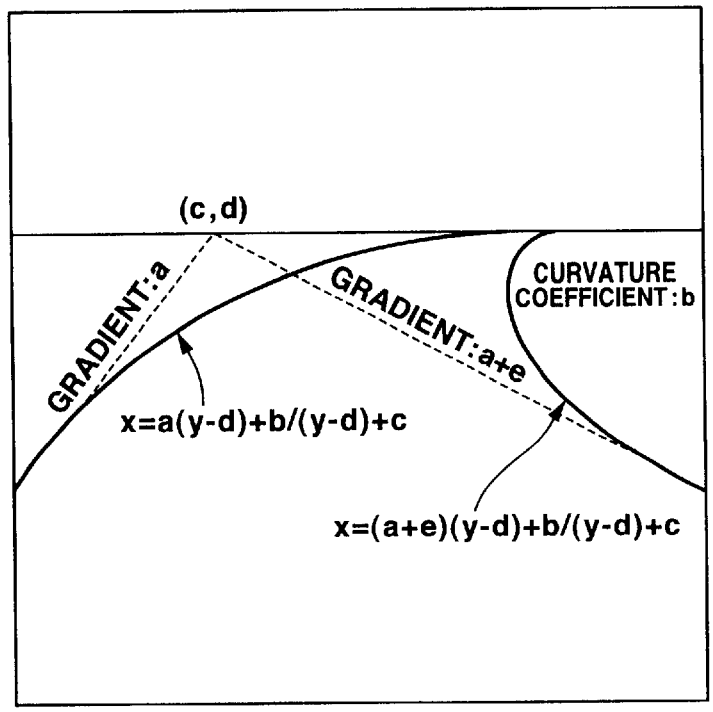
FIG. 5 is a view employed for explaining model lane markers.

The lane marker detecting process at step S1 is executed according to a method disclosed in Japanese Patent Provisional Publication No. 11-295550 proposed by inventors of the present invention, as shown in FIG. 4.

At step S22, controller 3 initializes parameters representative of a road shape and a vehicle behavior (hereinafter, these parameters called road parameters). In a X-Y image-plane coordinate system shown in FIG. 5, model lane markers are represented by the following equation (2) using the road parameters.

$$X=(a+ie)(Y-d)+b/(Y-d)+c \qquad (2)$$

where a, b, c, d and e are the road parameters, and i is 1 and 0. Assuming that a vertical dimension between camera 1 and a road surface is constant, road parameter a denotes a lateral displacement of vehicle VE between the lane markers, b denotes a road curvature, c denotes a yaw angle of vehicle VE (the optical axis of camera 1) relative to the road, d denotes a pitch angle of vehicle VE (the optical axis of camera 1) relative to the road, and e denotes a dimension between the lane markers.

Under the initial condition, the shape of the road and the lane markers and the vehicle behavior are set at values corresponding to center values, respectively since the shapes of the road and the lane markers and the vehicle behavior are not clear in this initial condition. More specifically, the lateral displacement a of vehicle VE within the lane markers is set at a center between the lane markers, the road curvature b is set at zero (straight), the yaw angle c relative to the lane markers is set at zero, the pitch angle d relative to the lane markers is set at α° indicative of a vehicle stopping condition, and the lane width e between the lane markers is set at a lane width of a highway representatively defined by the rule of a road structure.

Figure 6:
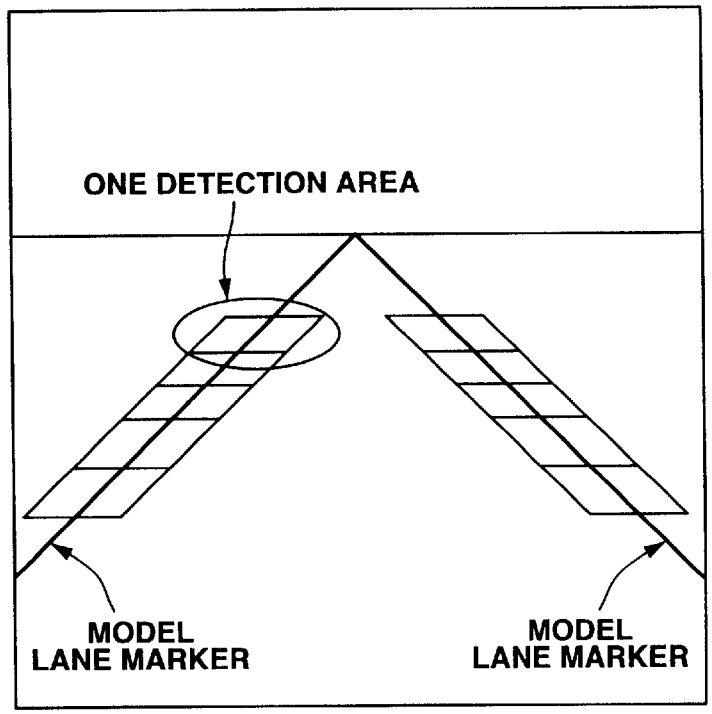
FIG. 6 is a view employed for explaining a method for setting initial values of lane-marker candidate-point detection areas.
Figure 7:
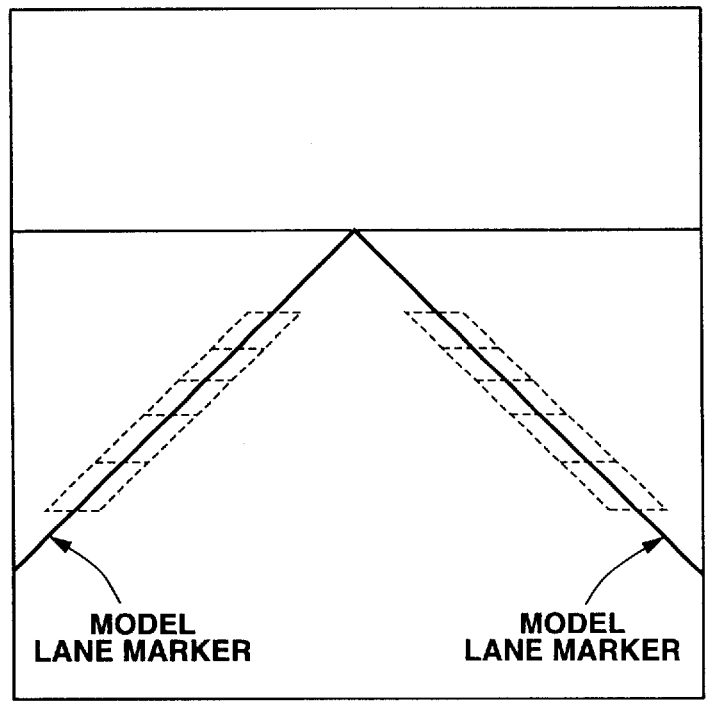
FIG. 7 is a view employed for explaining the setting method of the initial values of the detection area under a condition that lane markers have been already detected.
Figure 8:
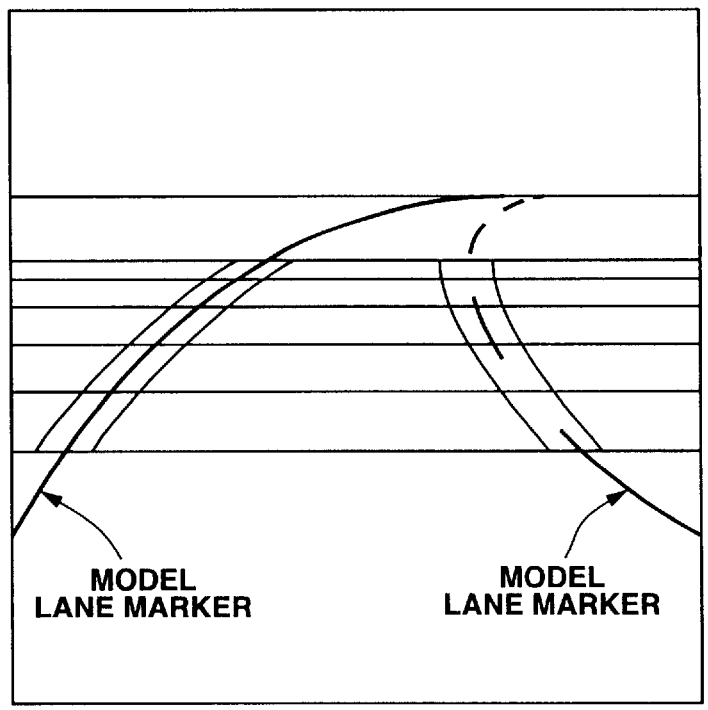
FIG. 8 is a view employed for explaining the detection area setting method on a road image.
Figure 9:
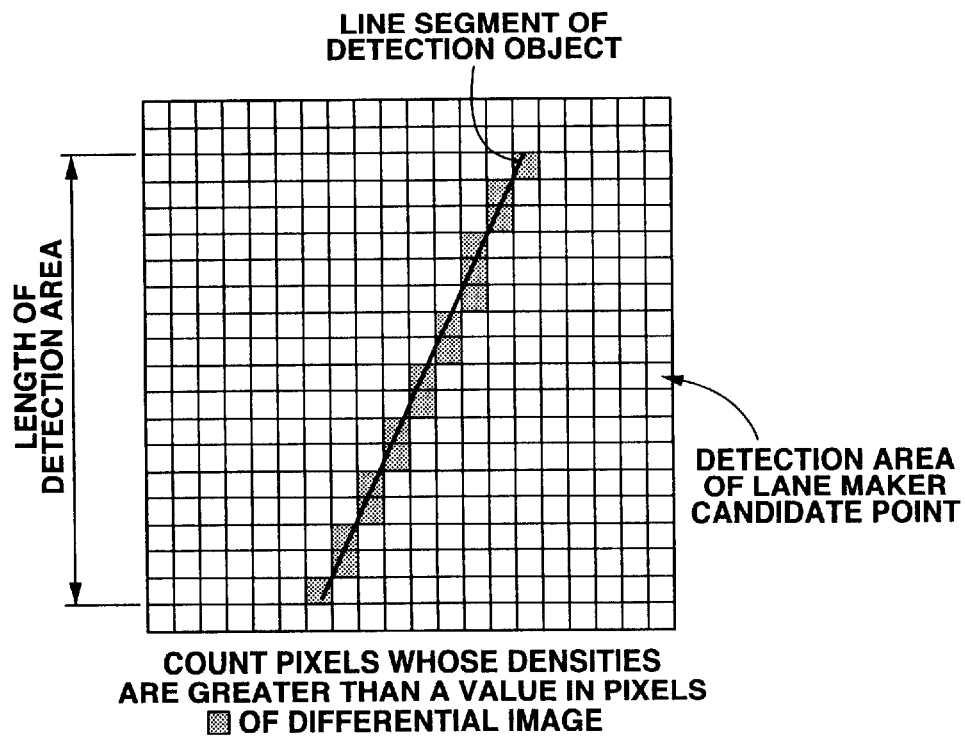
FIG. 9 is a view employed for explaining a detecting method of lane marker candidate points.
Figure 10:
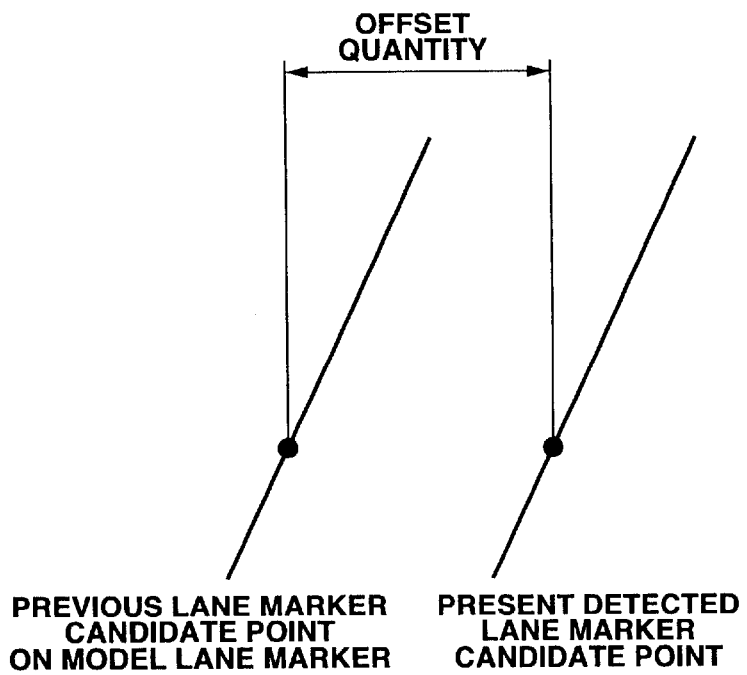
FIG. 10 is a view showing an offset quantity between a lane marker candidate point just detected and a point on the model lane marker previously detected.

At step S23, controller 3 initializes small areas for detecting the lane marker candidate points. Under the initial condition, since it is supposed that there is a large difference between the model lane markers obtained by inputting the initial values into the respective road parameters a to e and the real lane markers on the image plane, it is preferable that relatively large areas are set initially. As shown in FIG. 6, in this embodiment ten detection areas including five right detection areas and five left detection areas are searched, and the size of each detecting area is set large. If the lane markers have been detected already in the previous process, the size of each detection area is set small as shown in FIG. 7. The reason thereof is as follows: Since it is assumed that the difference between the real lane markers and the model lane markers is small, a possibility of an erroneous detection of detecting other objects will be decreased by setting the size of each detection area small. Further this small setting improves the processing speed of this process.

At step S24, controller 3 receives the image data which image processor 2 obtains by processing the image taken by camera 1.

At step S25, controller 3 sets the detection areas of the lane marker candidate points on the road image received from image processor 2. During this setting, the lane-marker candidate-point detection areas are set so that the model lane markers are located at centers of the respective detection areas as shown in FIG. 7, on the basis of the lane-marker candidate-point detection areas calculated at step S23 and the model lane markers obtained from the road parameters corrected at step S22 or S30. As shown in FIG. 7, the number of the lane marker detection areas is ten constituted by five detection areas for the right lane marker and five detection areas for the left lane marker. It will be understood that the lane marker detection areas may be set at positions offset from the model lane markers according to the change of the past model lane markers.

At step S26, controller 3 detects the lane marker candidate points in each lane marker detection area. In this detecting operation, first a differential image is produced by filtering the input image with a Sobel filter. Then, controller 3 counts suitable pixels which are located on the line segment and whose densities are greater than a value capable of extracting the detection line, with respect to each line segment generated by connecting a point on an upper base line and a point on a lower base line of each detection area. Further the points on the upper and lower base lines are varied, and as to a predetermined number of the line segments the counting of the suitable pixels are executed. The line segment, which includes the largest number of the suitable pixels in the whole line segments, is determined as a detection straight line. The start and end of the detection straight line are determined as the lane marker candidate points. When the number of the suitable pixels of the determined detection straight line is smaller than a predetermined rate to the number of pixels corresponding to the length of the detection area, controller 3 determines that there is no lane marker candidate point in this detection area.

For example, under a condition that the number of pixels corresponding to the length of the search are is fifteen and the predetermined rate is ½, if the number of the suitable pixels of the detection straight line are seven or less, controller 3 determines that there is no lane marker candidate point. If the number of the suitable pixels of the detection straight line segment are eight or more, controller 3 determines that the start and the end of the selected line segment is treated as the lane marker candidate points.

The above operation of determining the lane marker candidate points is executed by each lane-marker candidate-point detection area.

In determining the lane-marker candidate points, the predetermined rate may be set at a constant rate throughout all detection areas or may be varied by each detection area. Further the predetermined value of the density may be set at a constant value throughout all detection areas or may be varied by each detection area.

At step S27, controller 3 checks whether the number of the lane-marker candidate points of the whole lane-marker candidate-point detection area is greater than or equal to a predetermined value agreeable to deciding as a lane marker. When the number of the lane marker candidate points is smaller than the predetermined value, controller 3 determines that there is no lane marker in the detection areas, and the routine of this flowchart returns to step S23 to again initialize the size of the detection area. When the number of the lane-marker candidate points is greater than or equal to the predetermined value, the routine proceeds to step S28.

At step S28, controller 3 calculates an offset quantity between the determined lane-marker candidate point and a point on the model lane marker obtained by the previous processing by each lane marker candidate point.

At step S29, controller 3 calculates fluctuation quantities $\Delta a$, $\Delta b$, $\Delta c$, $\Delta d$ and $\Delta e$ of the road parameters a to e. The calculation of the fluctuation quantities $\Delta a$ to $\Delta e$ may be executed on the basis of a least-square method, for example, disclosed in Japanese Patent Provisional Publication No. 8-5388.

At step S30, controller 3 corrects road parameters a to e on the basis of fluctuation quantities $\Delta a$ to $\Delta e$ calculated at step S8. When the model lane marker expressed by the equation (1) is employed, the correction of the fluctuation quantities is executed by using the following equations (3).

$$a = a + \Delta a$$
$$b = b + \Delta b$$
$$c = c + \Delta c$$
$$d = d + \Delta d$$
$$e = e + \Delta e \quad (3)$$

Further, the corrected road parameters a to e are stored in a predetermined memory area of controller 3 as road parameters of a new model lane markers. Thereafter, the routine proceeds from step S1 to step S2 in FIG. 3.

Figure 11:
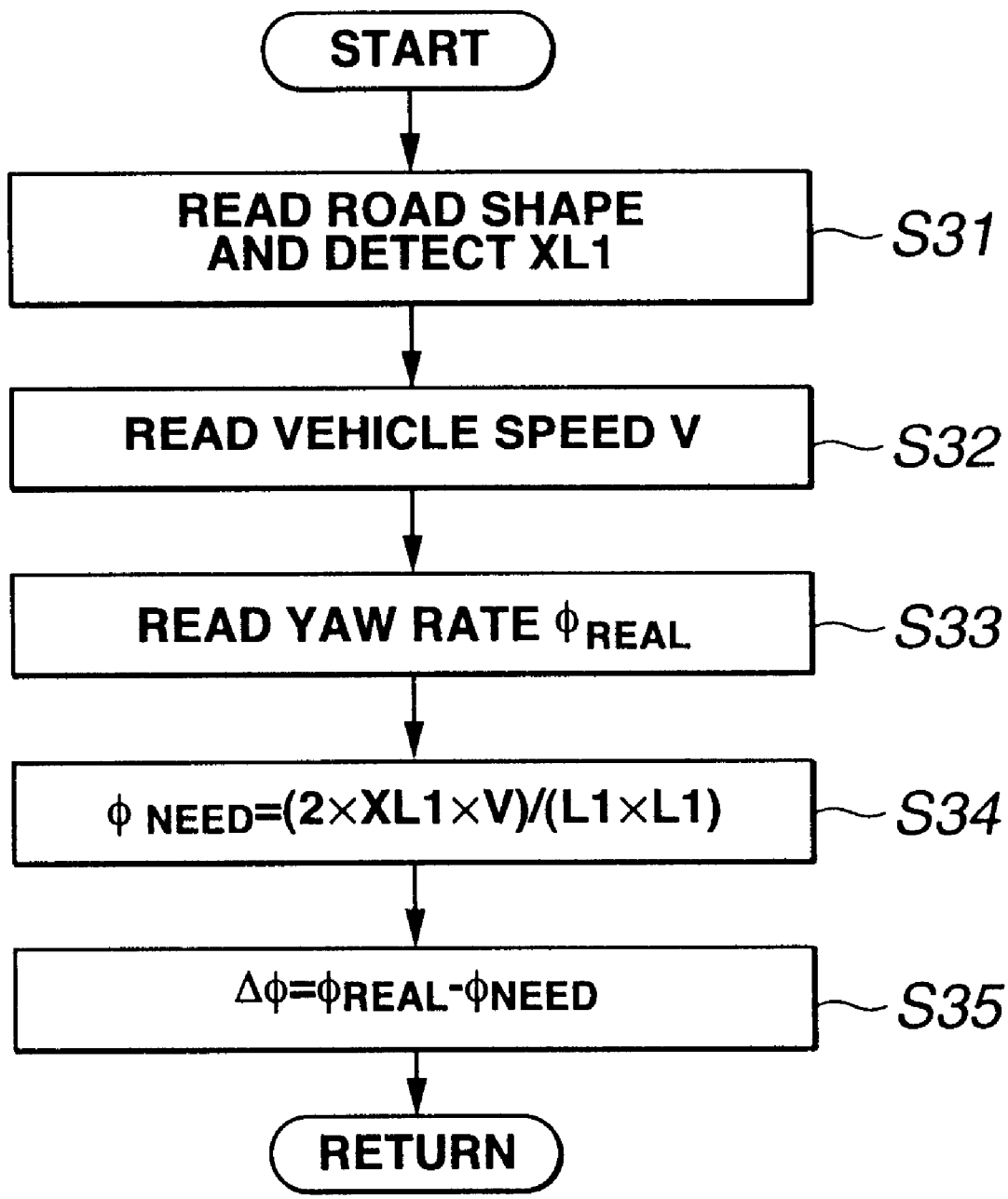
FIG. 11 is a flowchart showing a traveling condition monitoring process of the first embodiment.

Furthermore, the lane-departure predicting process of step S5 of FIG. 3 is executed as shown in FIG. 11 and as follows.

Figure 12:
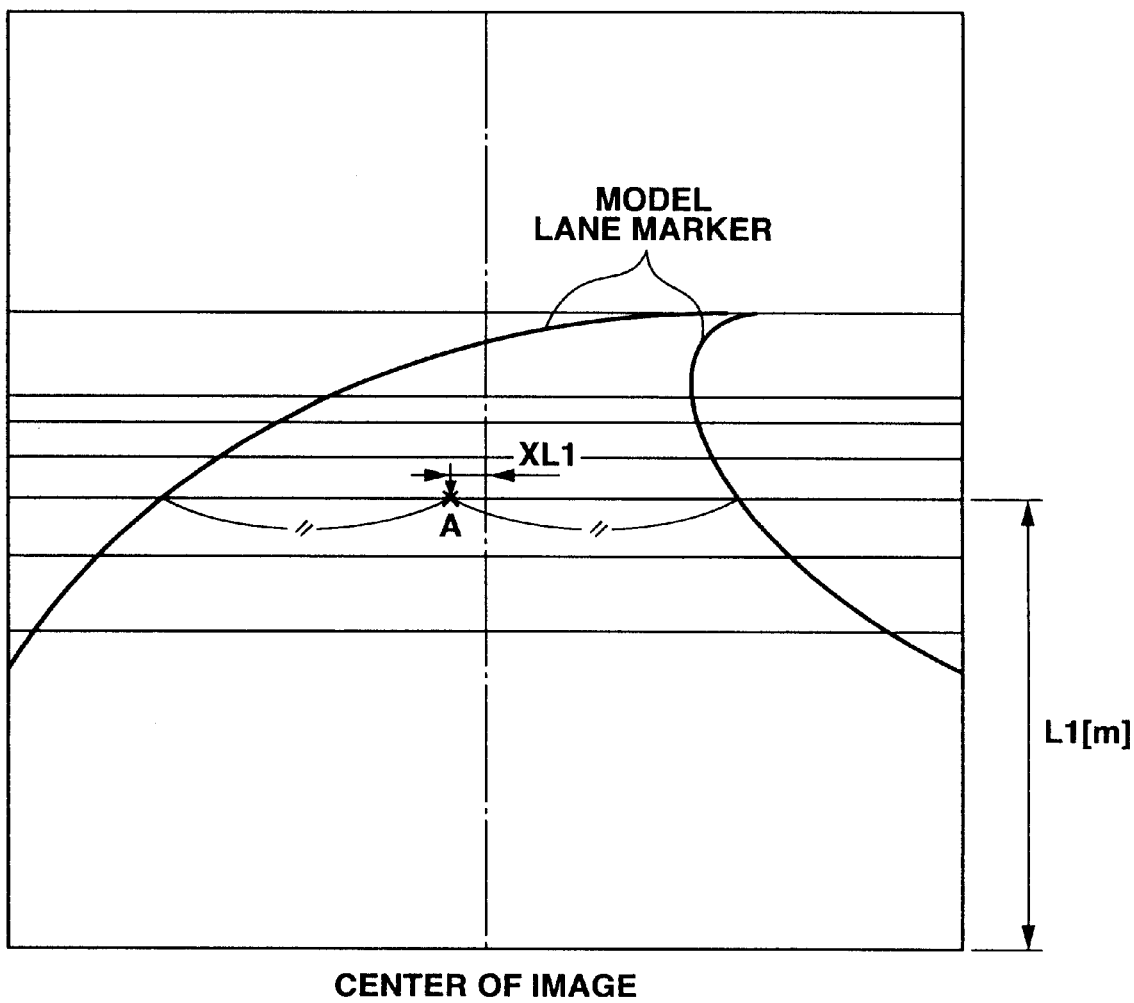
FIG. 12 is a view employed for explaining a method for detecting a lateral displacement at a fixation point.

At step S31, controller 3 estimates the road shape on the basis of the newest road parameters a to e stored in the storage area. Further, controller 3 detects a lateral displacement XL1 at a fixation point A on the image plane showing a view ahead of vehicle VE. More specifically, as shown in FIG. 12, when the road shape is estimated on the basis of the road parameters a to e corrected at step S30 of the lane marker detecting process shown in FIG. 4, the fixation point A is set at a position (target position) which is ahead of vehicle VE by L1m such as 30 m and is located at a center between the two model lane markers. Therefore, controller 3 detects a distance between the fixation point A and the point, which is L1[m] ahead of vehicle VE, as the lateral displacement XL1 relative to the lane center position defined by the two model lane markers, since camera 1 is set at a laterally center position of vehicle VE.

At step S32, controller 3 reads vehicle speed V from vehicle speed sensor 5, and at step S33 controller 3 reads real yaw rate $\phi_{REAL}$ from yaw rate sensor 4.

At step S34, controller 3 calculates target yaw rate $\phi_{NEED}$, which is a yaw rate necessary for reaching vehicle VE from the lateral displacement position to the lane center, on the basis of lateral displacement XL1 at fixation point A and the following equation (4).

$$\phi_{NEED} = (2 \times XL1 \times V)/(L1 \times L1) \quad (4)$$

At step S35, controller 3 calculates yaw rate difference $\Delta\phi$ between real yaw rate $\phi_{REAL}$ and target yaw rate $\phi_{NEED}$ ($\Delta\phi = \phi_{REAL} - \phi_{NEED}$). Then, controller 3 terminates the lane departure predicting process, and the routine proceeds to step S6 of FIG. 3.

In this embodiment, camera 1 corresponds to an image taking means, yaw rate sensor 4 corresponds to a turn degree detecting means, alarm 6 corresponds to an alarming means, the road lane marker detecting process of FIG. 3 corresponds to a lane marker detecting means, step S1 in FIG. 3, the road lane marker detecting process of FIG. 4 and the road shape estimating process from the road parameter executed at step S31 of FIG. 11 correspond to a road shape detecting means, the process executed at step S34 of FIG. 11 corresponds to a necessary turn degree detecting means, the process executed at step S6 of FIG. 3 corresponds to lane marker departure determining means, and the process executed at steps S8 to S20 corresponds to a steering control process.

The manner of operation of the first embodiment according to the present invention will be discussed hereinafter.

When vehicle VE travels a road, camera 1 takes a view ahead of vehicle VE. Image processor 2 receives the image taken by camera 1 and processes the image into predetermined image information. Controller 3 receives the predetermined image information from image processor 2 and executes the lane marker detecting process based on the predetermined image information to sequentially update the road parameters according to the road condition ahead of vehicle VE.

At this time, if vehicle VE travels straight, road curvature $\rho$ is set at zero ($\rho = 0$). Therefore, step S2 is repeated in the program of FIG. 3, and the lane-departure predicting process and the auxiliary steering control of auxiliary steering mechanism 7 are not executed.

If vehicle VE turns to right or left in an intersection or the like, turn signal lamp 8 is put in an operative state. Accordingly, if road curvature (lane-marker curvature) $\rho$ is changed by the turning of vehicle VE, the routine in FIG. 3 proceeds from step S2 to step S3. However, since turn signal lamp 8 is in the operative state, the determination of step S4 becomes negative. Therefore, the routine returns to step S1, and the lane-departure predicting process and the auxiliary steering control of auxiliary steering mechanism 7 are not executed.

Further, even if the driver executes a lane change, the steering wheel is steered and the steering torque TQ detected by steering torque sensor 9 becomes greater than threshold $T_{TH}$. Therefore, the routine returns to step S1, and the lane-departure predicting process and the auxiliary steering control of auxiliary steering mechanism 7 are also not executed.

Figure 13:
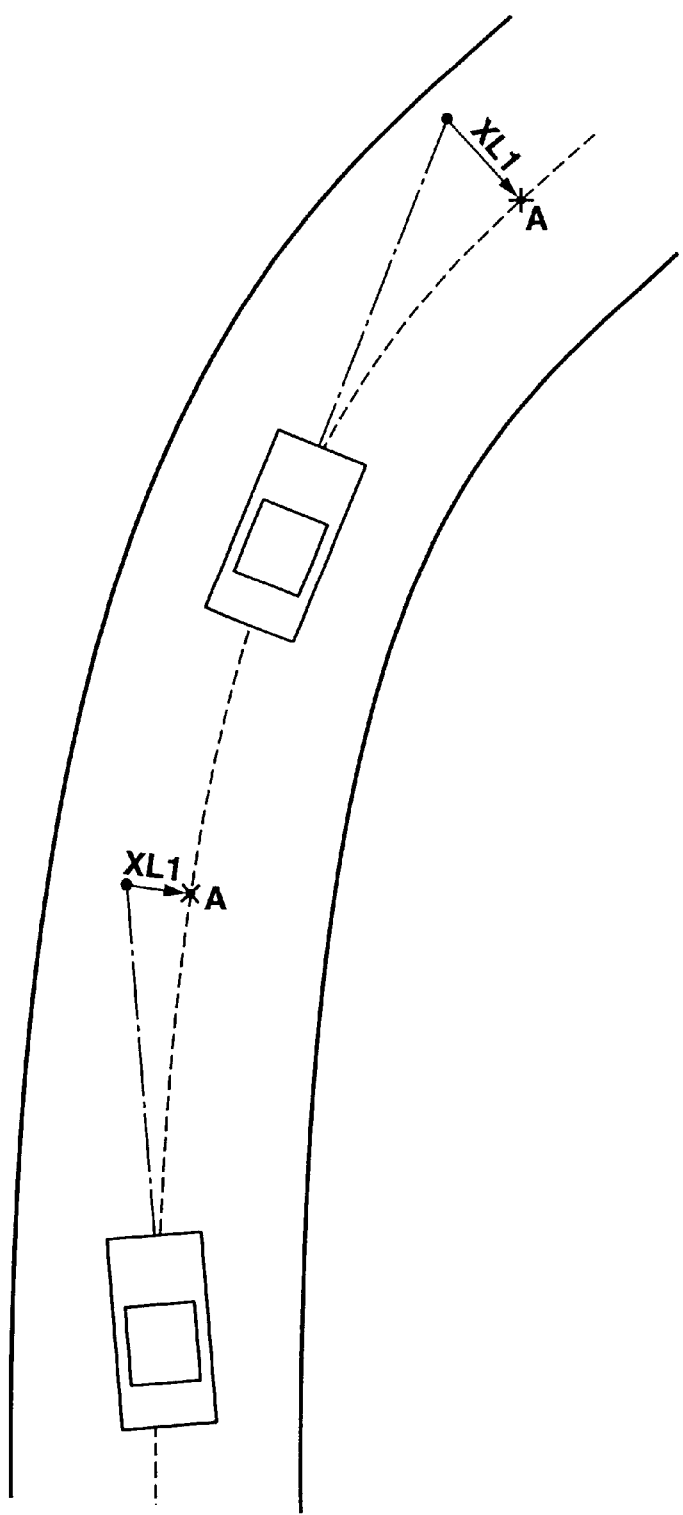
FIG. 13 is a view employed for explaining the operation of the system according to the present invention.

Under a condition that vehicle VE starts turning a curved road as shown in FIG. 13, if the driver does not steer the steering wheel to continue the non-steered condition, the routine of FIG. 3 proceeds from step S4 to step S5 wherein the lane-departure prediction process is executed on the basis of the lane detection information.

At this time, the road shape of the road ahead of vehicle VE is estimated on the basis of the road parameters calculated at step S1. Further, on the basis of this estimated road shape, controller 3 calculates lateral displacement XL1 at the fixation point A by the execution of step S31 in FIG. 11.

At the time when fixation point A reaches a right curve of the road ahead of vehicle VE, if vehicle VE is yet traveling straight and is located at the center of the lane, camera 1 is yet directed to a center of the lane. Therefore, the center of the image (the center of the lane) generally corresponds to the fixation point A which is a center of the two lane markers, and lateral displacement XL1 is generally zero. Under this situation, target yaw rate $\phi_{NEED}$ generally becomes zero when the step S34 is executed. Further, real yaw rate $\phi_{REAL}$ detected by yaw rate sensor 4 also becomes about zero. Accordingly, the absolute value of yaw rate difference $\Delta\phi$ becomes smaller than threshold $\phi_{TH}$, and controller 3 determines at step S6 that vehicle VE is traveling within the lane. Therefore, the routine of FIG. 3 returns from step S6 to step S1, and the steering control for the lane departure is not executed.

However, when the driver does not steer the steering wheel and when the absolute value of yaw rate difference $\Delta\phi$ becomes greater than threshold $\phi_{TH}$, controller 3 determines that vehicle tends to depart from the lane. Therefore, the routine of FIG. 3 proceeds from step S6 to step S7 wherein controller 3 outputs lane-departure alarm signal to alarm 6 to generate alarm or alarm display representative that vehicle VE tends to depart from the lane.

Simultaneously, controller 3 calculates the estimated lane-departure distance L and the lane-marker curvature $\rho$ at the estimated lane-departure point at step S8 and calculates the lane-departure time t by dividing the estimated lane-departure distance L by vehicle speed detection value V at step S9. Further, controller 3 calculates updating value $\Delta\rho$ for obtaining the controlled curvature $\rho_C$ at step S10 and starts counting the control interval timer at step S11. Furthermore, controller 3 calculates controlled curvature $\rho_C$ by adding updating value $\Delta\rho$ to the present controlled curvature $\rho_C$ at step S12, calculates target auxiliary steering angle $\theta^*$ on the basis of controlled curvature $\rho_C$ at step S13, and outputs target auxiliary steering angle $\theta^*$ to auxiliary steering mechanism 7 at step S14.

Therefore, the steering operation by auxiliary steering mechanism 7 is executed, and the controlled curvature $\rho_C$ of the traveling locus of vehicle VE is gradually increased along lane marker curvature $\rho$ as shown in FIG. 14.

By repeatedly executing the above-discussed increasing process of controlled curvature $\rho_C$ until controlled curvature $\rho_C$ becomes equal to or greater than lane marker curvature $\rho$, controlled curvature $\rho_C$ is gradually increased. Accordingly, vehicle VE is controlled so as to travel inside the lane departure point P at the time of first detecting the lane departure and to go to a position farther than a first recognized lane departure point P. When controlled curvature $\rho_C$ at last becomes equal to lane marker curvature $\rho$, the routine of FIG. 3 proceeds from step S15 through step S18 to step S19 to execute the lane tracking control for adjusting controlled curvature $\rho_C$ to lane marker curvature $\rho$.

Thereafter, when vehicle VE travels through the curve and enters a straight road and when lane marker curvature $\rho$ becomes zero ($\rho=0$), the lane marker tracking steer control process of steps S7 to S20 is terminated and the routine of FIG. 3 returns to step S1.

During the lane tracking control process of steps S7 to S20, when the driver steers the steering wheel, the determination at step S17 or S20 becomes affirmative. Therefore, the routine proceeds to step S17a wherein controller 3 stops outputting target auxiliary steering angle to auxiliary steering mechanism 7 to terminate the lane tracking control. Thereafter, the routine of FIG. 3 returns to step S1.

Accordingly, it becomes possible to smoothly execute the lane departure avoiding process without affecting the steering operation of the driver.

With the thus arranged first embodiment according to the present invention, when controller 3 detects the tendency of the lane departure of vehicle VE under a condition that vehicle VE advances from a straight road to a curved road (right or left), controller 3 commands alarm device 6 to generate alarm and gradually increases controlled curvature $\rho_C$ so as to bring the curvature of the traveling locus of vehicle VE to lane marker curvature $\rho$. Accordingly, the time period from a first detection moment of the lane departure tendency to a lane departure moment is elongated as compared with a case that the steering condition at the first detection moment is not changed. This facilitates driver's intervention to the steering operation.

Furthermore, since vehicle VE travels along the outer lane marker of the curved road, the turned outer wheel of vehicle VE runs on rumble strips which are formed on the outer lane marker and has micro asperities. Accordingly, noises and vibrations due to rumble strips warn the driver that there is a tendency of the lane departure of vehicle VE.

Figure 15:
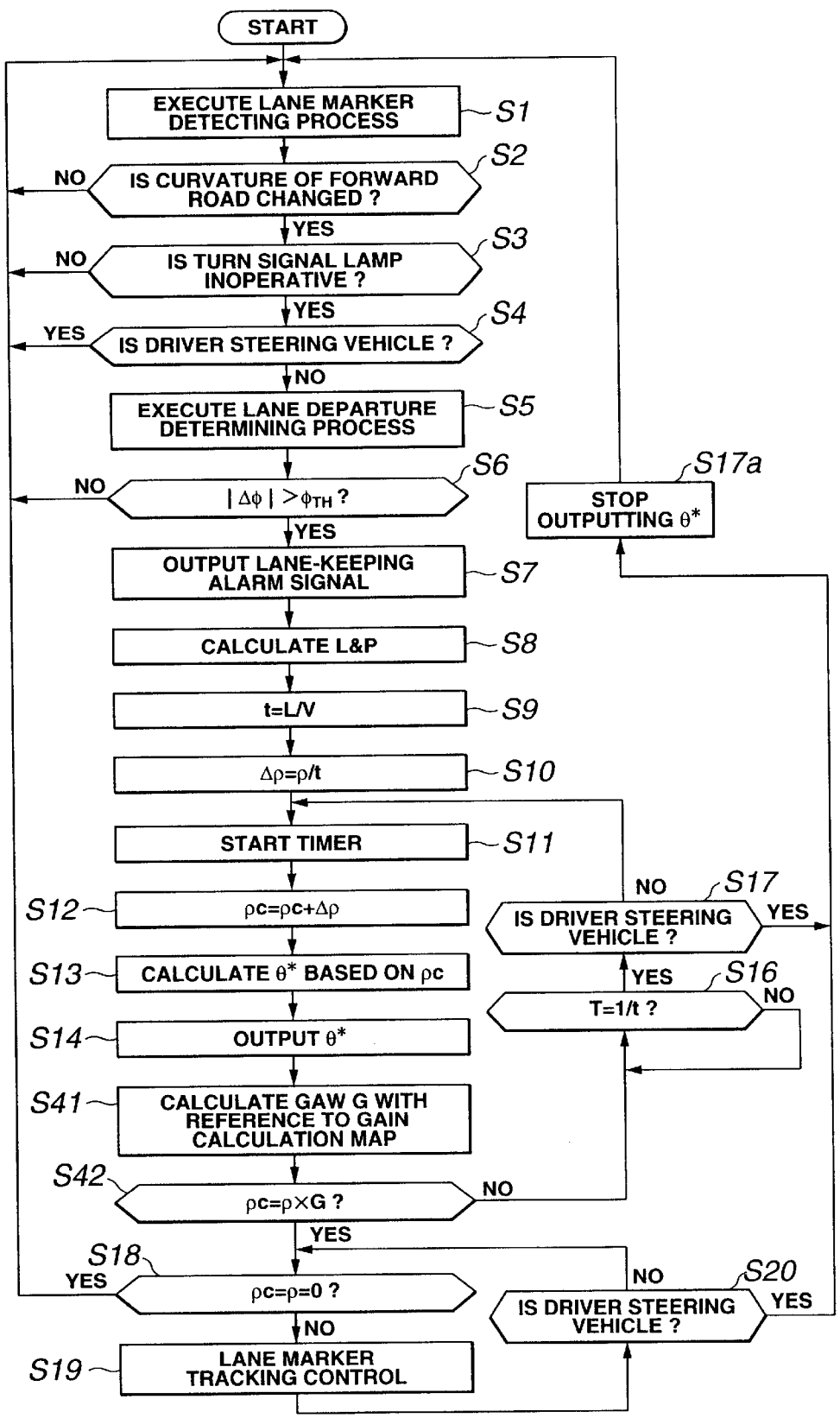
FIG. 15 is a flowchart showing the lane tracking control process employed in a second embodiment according to the present invention.
Figure 16:
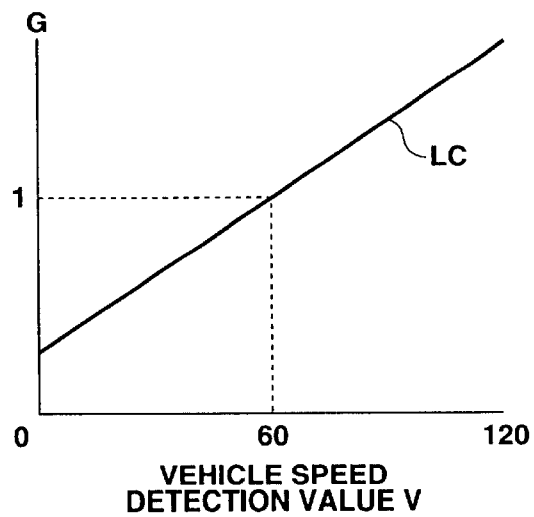
FIG. 16 is a map showing a relationship between a vehicle speed detection value V and a controlled curvature gain G.
Figure 17:
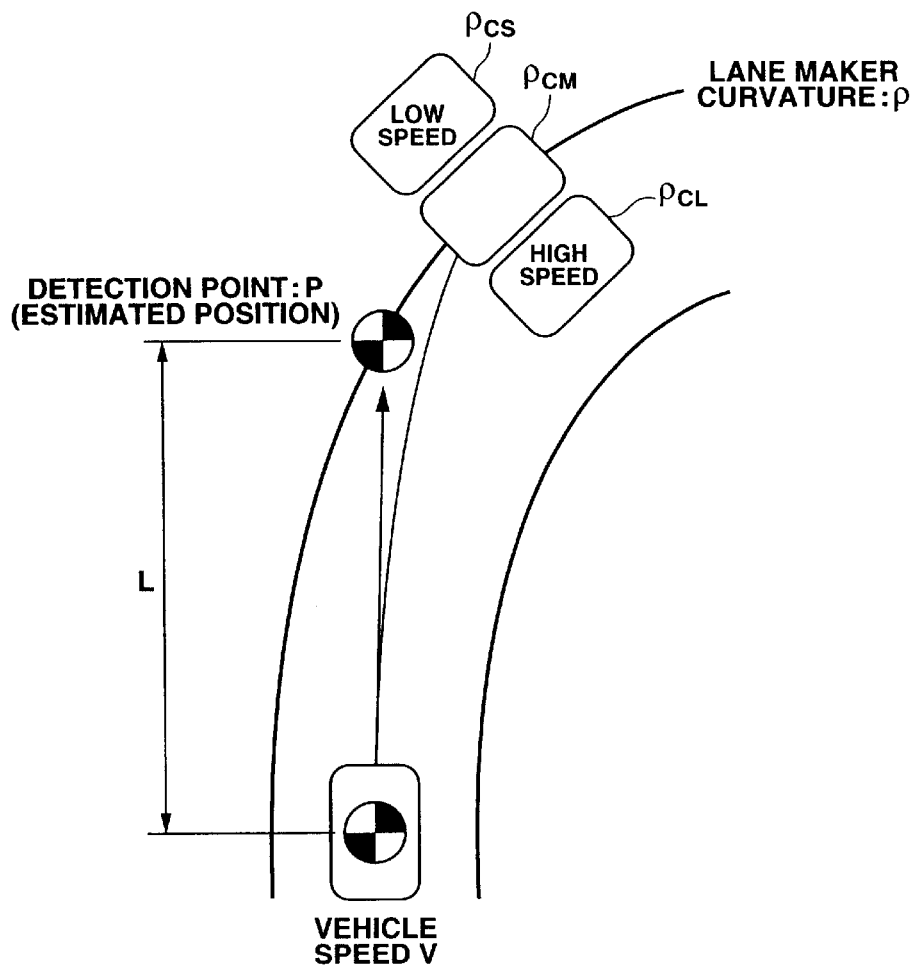
FIG. 17 is a view employed for explaining the lane tracking operation of the second embodiment.

Referring to FIGS. 15 to 17, there is shown a second embodiment of the lane tracking control system S according to the present invention. The basic construction of the second embodiment is the same as the construction of the first embodiment shown in FIG. 1.

The second embodiment is specifically arranged to change the manner of approaching the controlled curvature $\rho_C$ to the road curvature $\rho$ according to the vehicle speed V of vehicle VE. More specifically, the lane tracking control executed by controller 3 of FIG. 14 comprises steps S41 and S42 instead of step S15 of FIG. 3. At step S41 subsequent to the execution of step S14, controller 3 calculates a controlled curvature gain G from vehicle speed detection value V and a controlled curvature gain map shown in FIG. 15. Further, at step S42 subsequent to the execution of step S41, controller 3 determines whether or not controlled curvature $\rho_C$ is greater than or equal to a value obtained by multiplying lane marker curvature $\rho$ by controlled curvature gain G. When the determination at step S42 is negative ($\rho_c < \rho \times G$), the routine of FIG. 3 proceeds to step S16. When the determination at step S42 is affirmative ($\rho_c \geq \rho \times G$), the routine proceeds to step S18. The other steps of FIG. 14 are the same as those of FIG. 3. Therefore, the other steps of FIG. 14 are denoted by the same reference numerals of FIG. 3, and the explanation thereof is omitted herein.

The map for calculating controlled-curvature gain G is represented as shown in FIG. 14 in that a horizontal axis is the vehicle speed detection value V, a vertical axis is the controlled curvature gain G, and a characteristic line LC indicates a relationship between vehicle speed detection value V and controlled-curvature gain G. As is clearly from the characteristic line LC in FIG. 14, when vehicle speed detection value V is zero (V=0), controlled-curvature gain G is about 0.3 (G≈0.3). Controlled-curvature gain G is linearly increased according to the increase of vehicle speed detection value V. When vehicle speed detection value V takes a set value Vs such as 60 km/h (V=Vs=60 km/h), controlled-curvature gain G is set at 1 (G=1). Even in the area that controlled curvature gain G is greater than 1, controlled curvature gain G linearly increases according to the increase of vehicle speed detection value V.

With the thus arranged second embodiment according to the present invention, when controlled-curvature gain G is 1 (G=1) because vehicle speed V of vehicle VE is the set vehicle speed Vs, controlled curvature $\rho_C$ is controlled so as to correspond to lane marker curvature $\rho$ as shown by $\rho_{CM}$ in FIG. 17. However, when vehicle speed detection value V is smaller than set value Vs, controlled curvature gain G takes a value smaller than 1 (G<1), and therefore controller curvature $\rho_C$ obtained from ($\rho \times G$) takes a value smaller than the lane marker curvature $\rho$. Therefore, controlled curvature $\rho_C$ takes a value near a curvature $\rho_{CS}$ of FIG. 17, which curvature $\rho_{CS}$ approaches a value representative of a straight line rather than lane marker curvature $\rho$.

On the other hand, when vehicle speed detection value V of vehicle VE is higher than set value Vs, controlled curvature gain G takes a value greater than 1 (G>1), and therefore controlled curvature $\rho_C$ obtained from ($\rho \times G$) takes a value greater than lane marker curvature $\rho$.

Consequently, when V=Vs, controlled curvature $\rho_C$ corresponds to lane marker curvature $\rho$, and therefore vehicle VE travels along the lane maker. When V<Vs, the traveling locus of vehicle VE becomes a slower curve which slowly departs from the lane marker. When V>Vs, the traveling locus of vehicle VE is slowly directed to a center portion between the two lane markers.

Accordingly, when vehicle VE travels at high speed in that the lane departure time is small, although vehicle VE travels within the lane or near the outer lane marker. When vehicle VE travels at low speed in that the lane departure time is relatively large, vehicle VE slowly crosses the outer lane marker and is put in the lane departure condition without traveling within the lane or along the outer lane marker. Accordingly, when vehicle VE travels at low speed, controller 3 prevents vehicle VE from steadily and autonomously turning a curve. Further, under the condition that the lane departure alarm is generated, the driver can recognize the necessity of the steering operation from the alarm.

Figure 18:
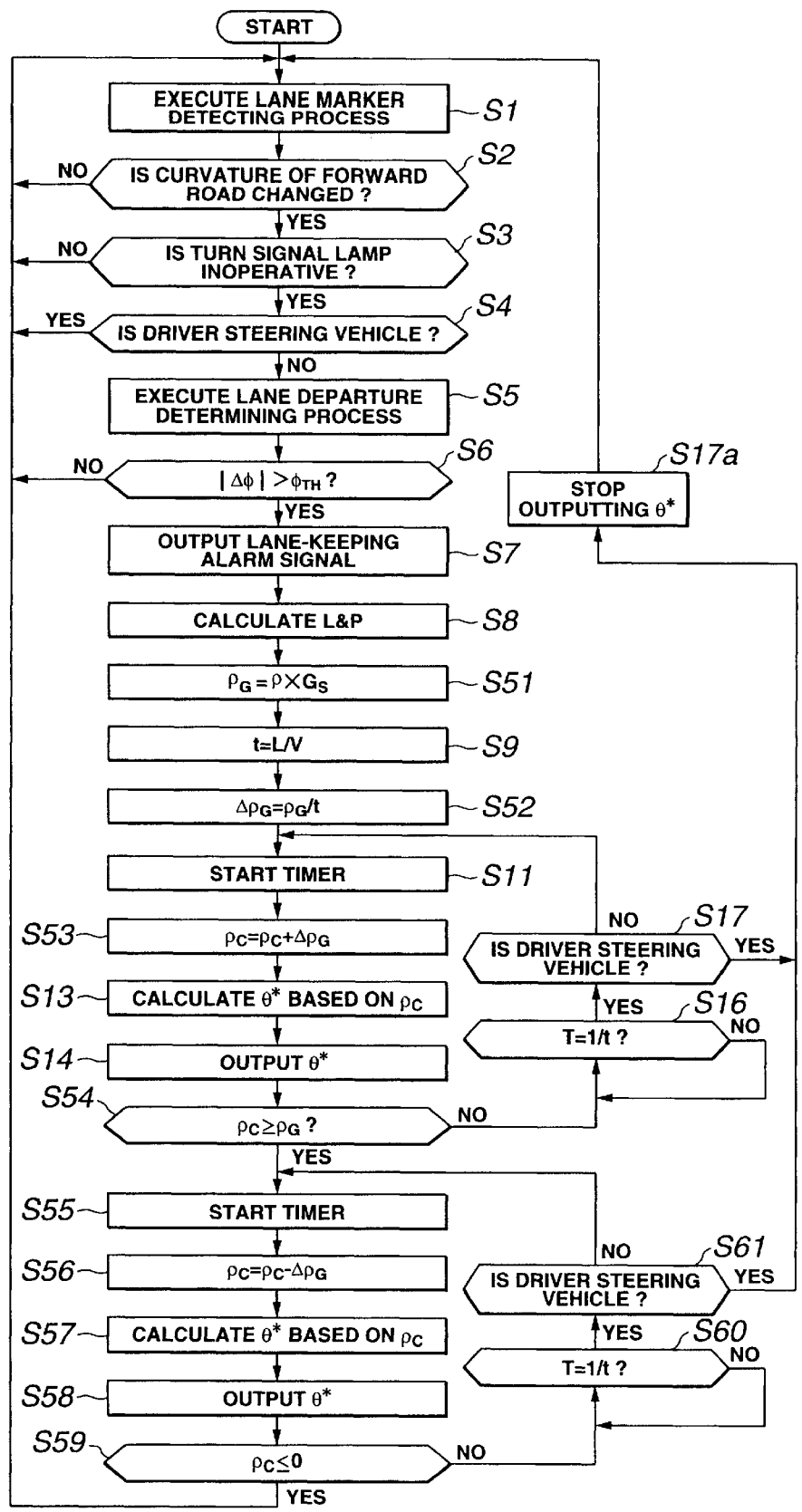
FIG. 18 is a flowchart showing the lane tracking control process employed in a third embodiment according to the present invention.
Figure 19:
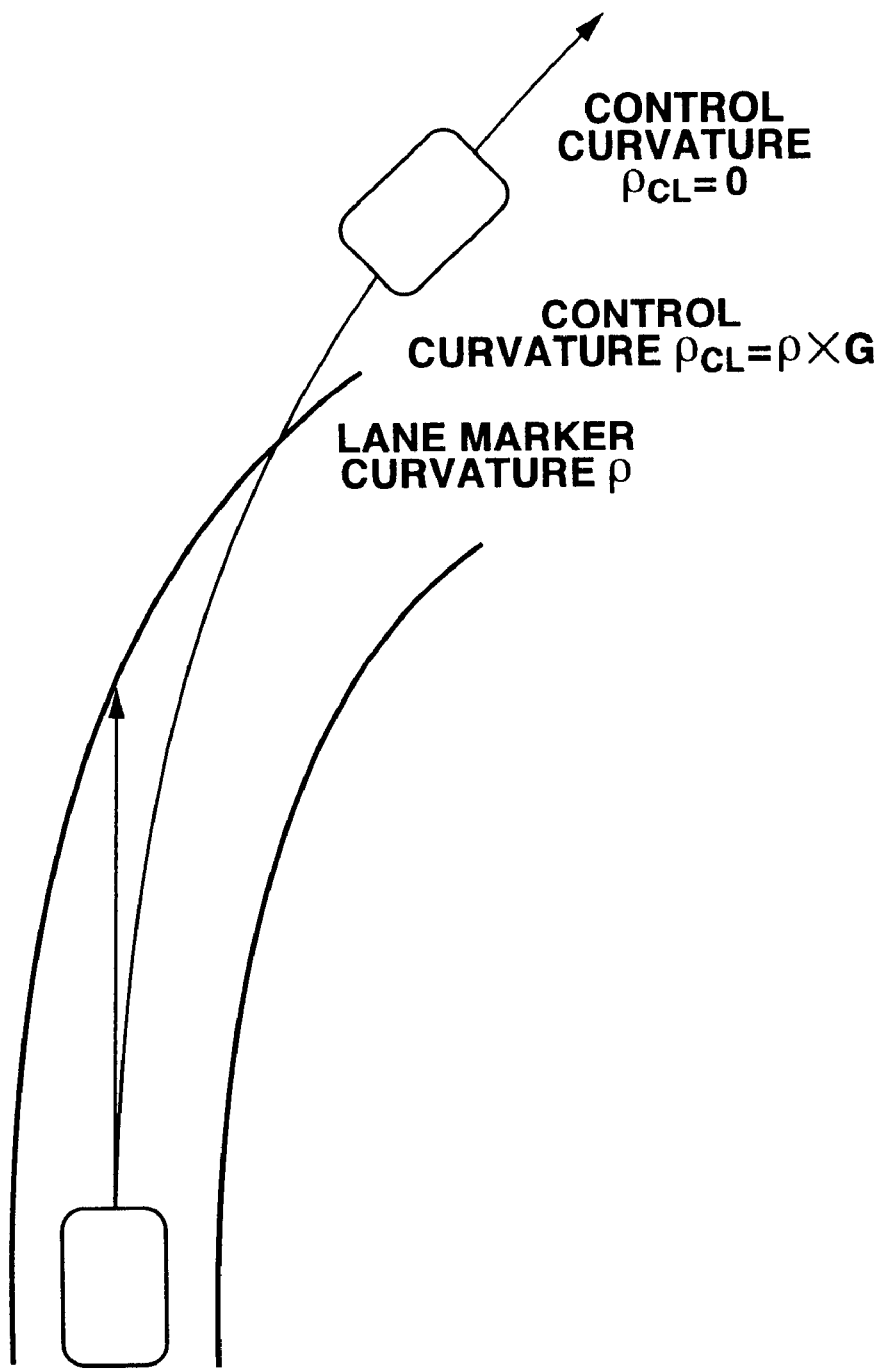
FIG. 19 is a view employed for explaining the lane tracking operation of the third embodiment.

Referring to FIGS. 18 and 19, there is shown a third embodiment of the lane tracking control system S according to the present invention. The basic construction of the third embodiment is the same as the construction of the first embodiment shown in FIG. 1.

The third embodiment is arranged to elongate the lane departure time and to increase the lane departure distance and to decrease departure quantity relative to the lane if vehicle VE departs from the lane. More specifically, as shown in FIG. 18, the lane tracking control process executed by controller 3 is changed from the process shown in FIG. 3.

The lane tracking control process shown in FIG. 18 newly comprises step S51 provided between steps S8 and S9, step S52 provided instead of step S10 of FIG. 3, step S53 provided instead of step S12 of FIG. 3, and step S54 provided instead of step S15 of FIG. 3. At step S51 subsequent to the execution of step S8, controller 3 calculates controlled curvature $\rho_G$ by multiplying lane marker curvature $\rho$ by a fixed gain $G_S$ ($\rho_G = \rho \times G_S$). Fixed gain $G_S$ is a value for setting the lane departure time or the lane departure point. At step S52 subsequent to the execution of step S9, controller 3 calculates updating value $\Delta\rho_G$ for controlled curvature by dividing controlled curvature by lane departure time t ($\Delta\rho_G = \rho_G/t$). At step S53 subsequent to the execution of step S11, controller 3 calculates a new controlled curvature $\rho_C$ by adding updating value $\Delta\rho_G$ to the present controlled curvature $\rho_G$. Further, at step S54 subsequent to the execution of step S11, controller 3 determines whether controller curvature $\rho_C$ is greater than or equal to controller curvature $\rho_G$ calculated at step S51.

Further, steps S18 to S20 are omitted, and steps S55 to S59 are newly added. At step S55 subsequent to the affirmative determination at step S54 or the negative determination at step S61, controller 3 starts counting of time. At step S56 subsequent to the execution of step S55, controller 3 calculates new controlled curvature $\rho_C$ by subtracting updating value $\Delta\rho_G$ from the present controlled curvature $\rho_c$ ($\rho_c = \rho_c - \Delta\rho$). At step S57 subsequent to the execution of step S56, controller 3 calculates target auxiliary steering angle $\theta^*$ on the basis of controller curvature $\rho_c$. At step S58, controller 3 outputs the calculated target auxiliary steering angle $\theta^*$ to auxiliary steering mechanism 7. At step S59, controller 3 determines whether or not controlled curvature $\rho_C$ is equal to or smaller than zero. When the determination at step S59 is negative ($\rho_c>0$), the routine proceeds to step S60. When the determination at step S59 is affirmative ($\rho_c \leq 0$), the routine returns to step S1. At step S60, controller 3 determines whether or not the timer value T of the control interval timer reaches a value 1/t obtained by dividing 1 by lane-departure time t. When the determination at step S60 is negative (T<1/t), the routine repeats to step S60 until time value T reaches the value 1/t (T=1/t). When the determination at step S60 becomes affirmative (T$\geq$1/t), the routine proceeds to step S61 wherein controller 3 determines whether or not the driver is steering vehicle VE. When the determination at step S61 is affirmative, the routine proceeds to step S17a. When the determination at step S61 is negative, the routine returns to step S55.

With the thus arranged third embodiment according to the present invention, when controller 3 detects the tendency of the lane departure, controller 3 calculates the lane marker curvature p at the departure distance L and the lane departure point P at step S8, and calculates a second controlled curvature $\rho_G$ by multiplying the calculated lane marker curvature $\rho$ by fixed gain $G_S$ for setting the lane departure time and the lane departure point P at step S51. Therefore, by gradually increasing the controlled curvature $\rho_C$ so as to correspond controlled curvature $\rho_C$ to the calculated second controlled curvature $\rho_G$, the traveling locus of vehicle VE approaches the lane marker curvature p. By this control, the lane departure time until vehicle VE is put in the lane departure condition is elongated and the lane departure point P is also increased, as shown in FIG. 19. Further, when the controlled curvature $\rho_C$ corresponds to second controlled curvature $\rho_G$, the controlled curvature $\rho_C$ is gradually decreased by updating value $\Delta\rho_G$, and when controlled curvature $\rho_C$ reaches zero ($\rho_c=0$), the lane tracking control is terminated.

That is, the auxiliary steering operation by auxiliary steering mechanism 7 is terminated on or before vehicle VE is put in the lane departure condition. Accordingly, vehicle VE gradually departs from the lane, and the driver firmly recognizes the lane departure condition and the necessity of the steering intervention.

Figure 20:
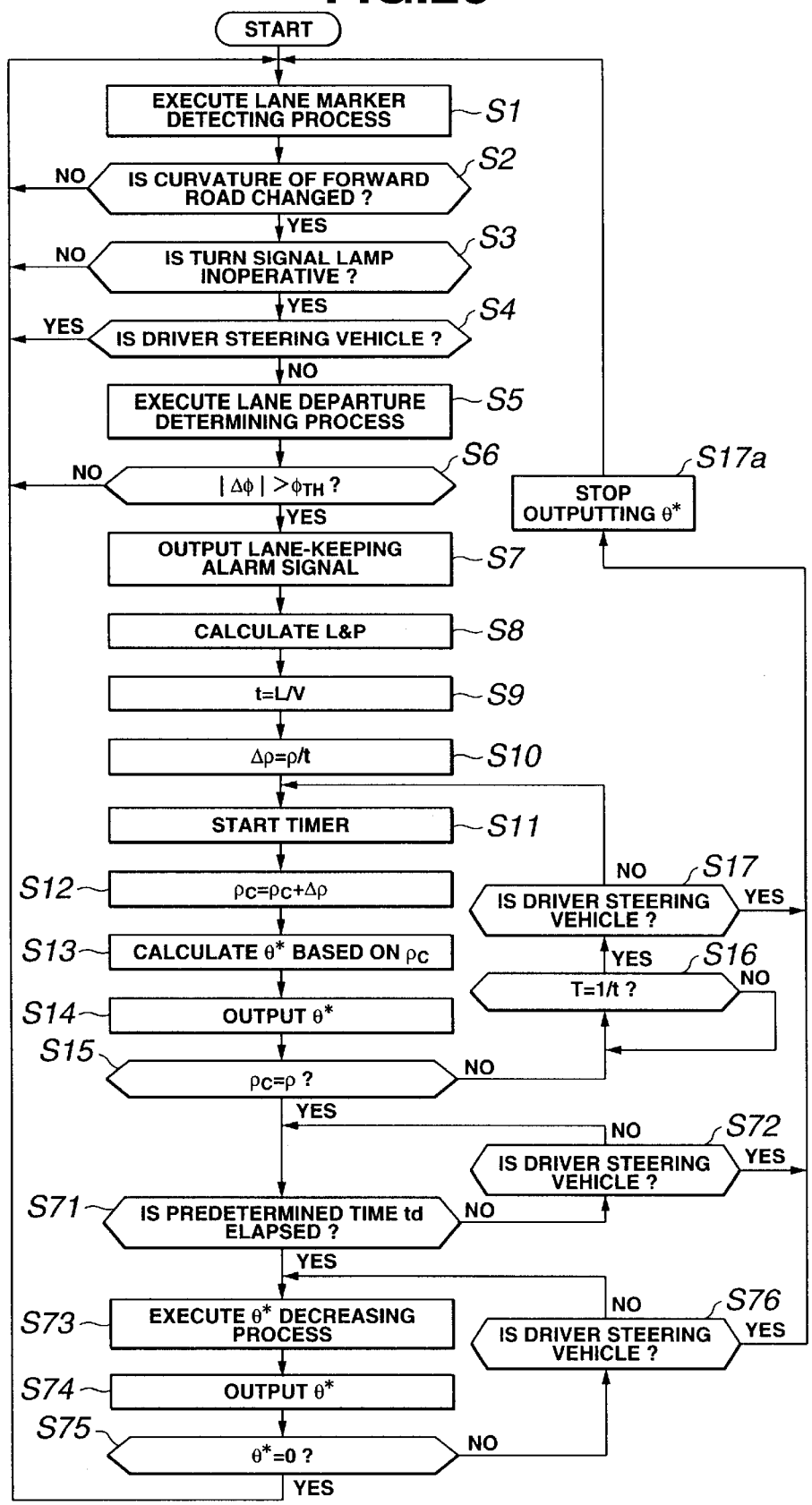
FIG. 20 is a flowchart showing the lane tracking control process employed in a fourth embodiment according to the present invention.
Figure 21:
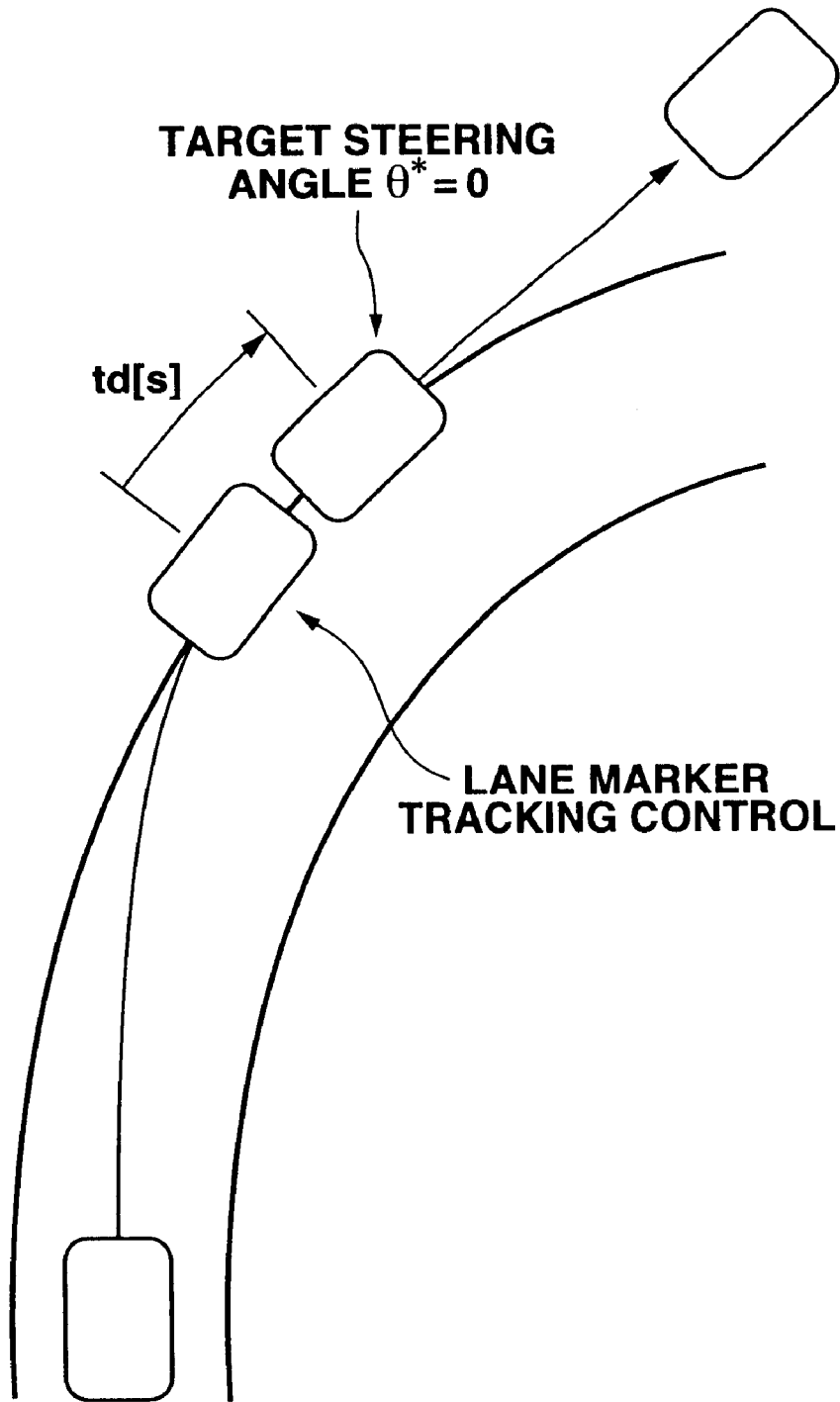
FIG. 21 is a view employed for explaining the lane tracking operation of the fourth embodiment.

Referring to FIGS. 20 and 21, there is shown a fourth embodiment of the lane tracking control system S according to the present invention. The basic construction of the fourth embodiment is the same as the construction of the first embodiment shown in FIG. 1.

The fourth embodiment is specially arranged to gradually depart vehicle VE from the lane after controlled curvature $\rho_C$ is controlled to correspond to the lane marker curvature $\rho$. More specifically, as shown in FIG. 20, the lane tracking control process executed by controller 3 is changed from the process shown in FIG. 3. The lane tracking control process of the fourth embodiment newly comprises steps S71 to S76 instead of steps S18 to S20 of FIG. 3. The other steps of FIG. 20 are the same as those of FIG. 3 and are denoted by the same reference numerals of FIG. 3. The explanation of the other steps is therefore omitted herein.

When controller 3 determines at step S15 that controlled curvature $\rho_C$ corresponds to the lane marker curvature $\rho$, the routine proceeds to step S71 wherein controller 3 determines whether or not a lane marker tracking time td is elapsed. When the determination at step S71 is negative, the routine proceeds to step S72 wherein controller 3 determines whether or not the driver is executing the steering operation. When the determination at step S72 is negative, the routine returns to step S71. When the determination at step S72 is affirmative, the routine proceeds to step S17a.

When the determination at step S71 is affirmative, the routine proceeds to step S73 wherein controller 3 executes a target auxiliary steering angle decreasing control wherein a new target auxiliary steering angle θ* is obtained by subtracting a predetermined value Δθ from the present target auxiliary steering angle θ* (θ*=θ*−Δθ) if the present target auxiliary steering angle is positive, and the new target auxiliary steering angle θ* is obtained by subtracting a predetermined value Δθ from the present target auxiliary steering angle θ* (θ*=θ*+Δθ) if the present target auxiliary steering angle is negative. At step S74 subsequent to the execution of step S73, controller 3 outputs the new target auxiliary steering angle θ* to auxiliary steering mechanism 7. At step S75 subsequent to the execution of step S74, controller 3 determines whether target auxiliary steering angle θ* is zero or not. When the determination at step S75 is negative (θ*≠0), the routine of FIG. 20 proceeds to step S76. When the determination at step S75 is affirmative (θ*=0), the routine of FIG. 20 returns to step S1.

With the thus arranged fourth embodiment, when controller 3 detects that vehicle VE tends to depart from the lane, controller 3 commands alarm 6 to generate the lane departure alarm and calculates lane departure distance L, lane marker curvature ρ at lane departure point P and lane departure time t. On the basis of these calculated values L, ρ and P, controlled curvature $ρ_C$ is gradually increased so as to correspond to the lane curvature ρ at the time when vehicle VE travels for the lane departure time t, as shown in FIG. 21. Further, when controlled curvature $ρ_C$ corresponds to lane marker curvature ρ, the corresponded condition of controlled curvature with lane marker curvature ρ is maintained for lane tracking time td, and thereafter target auxiliary steering angle θ* is gradually decreased till zero. By this control, the lane tracking condition of vehicle VE is gradually cancelled. Accordingly, the driver of vehicle VE can firmly recognize the lane departure condition and the necessity of the steering intervention.

Figure 22:
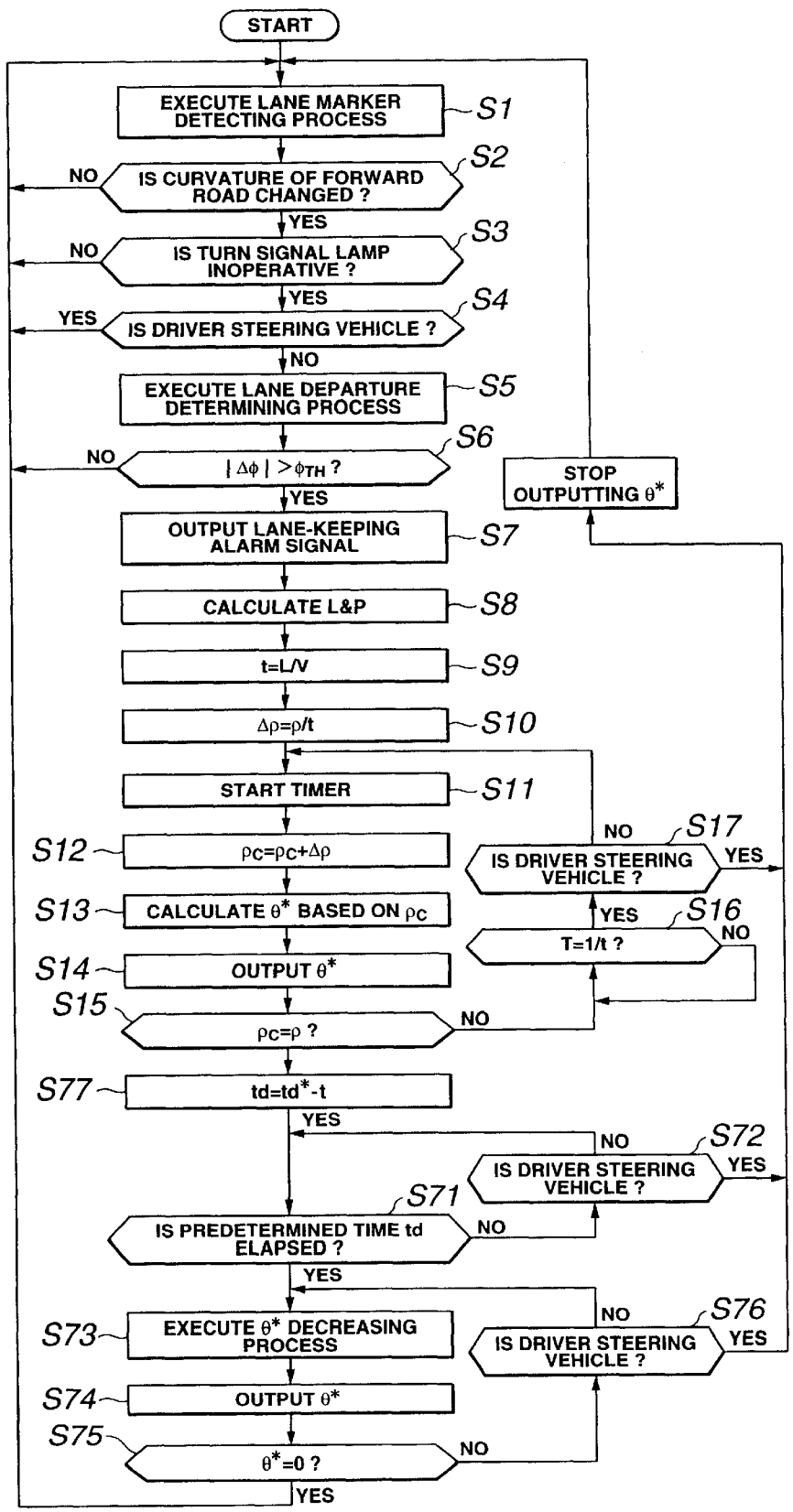
FIG. 22 is a flowchart showing the lane tracking control process employed in a fifth embodiment according to the present invention.
Figure 23:
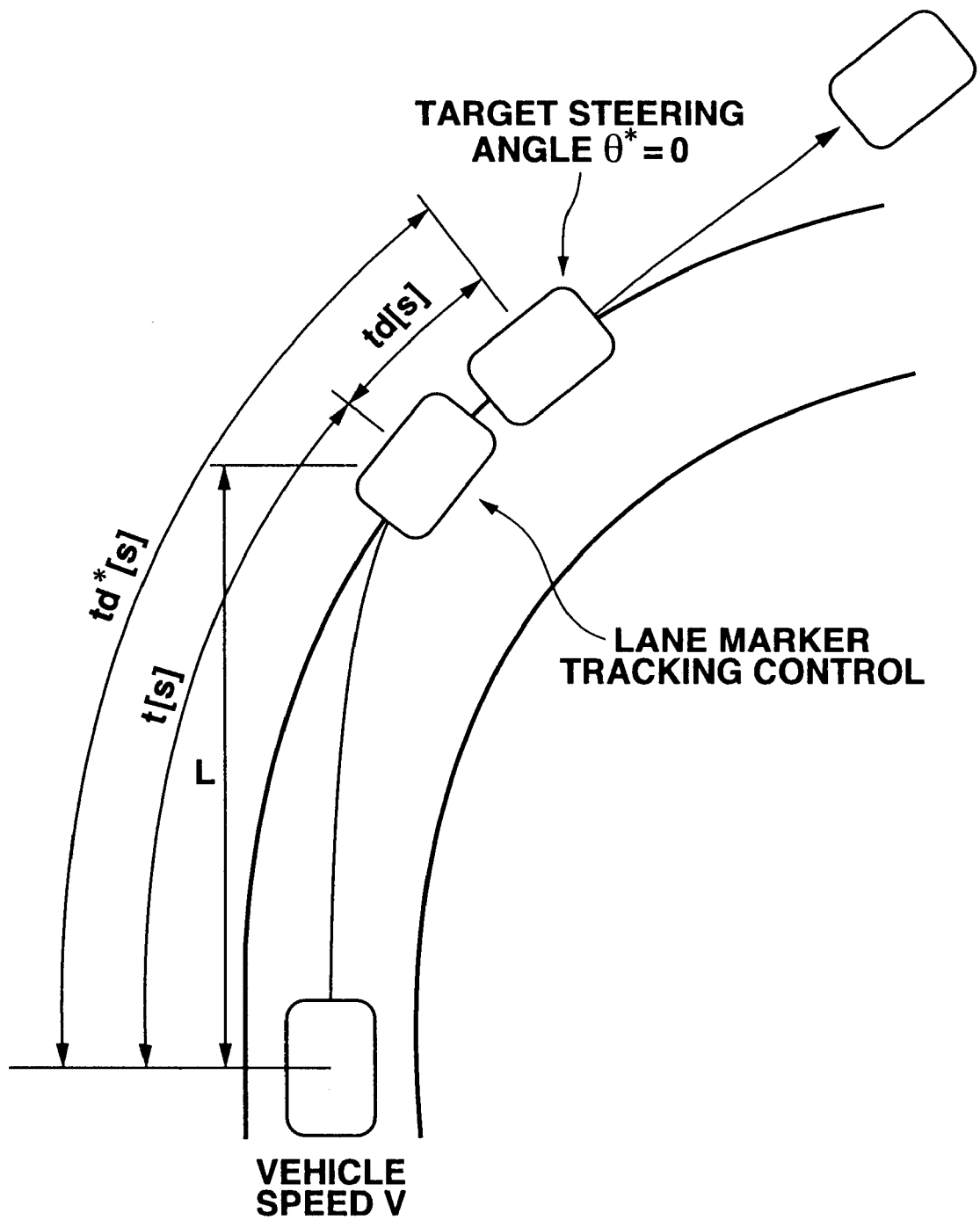
FIG. 23 is a view employed for explaining the lane tracking operation of the fifth embodiment.

Referring to FIGS. 22 and 23, there is shown a fifth embodiment of the lane tracking control system S according to the present invention. The basic construction of the fifth embodiment is the same as the construction of the first embodiment shown in FIG. 1.

The fifth embodiment is specially arranged to control the lane departure time at a constant time period wherein the lane departure time is a time period between the detection of the lane departure tendency and the real lane departure of vehicle VE. More specifically, as shown in FIG. 22, the lane tracking control process of the fifth embodiment is based on the flowchart of FIG. 20 and further comprises step S77 provided between steps S15 and S71. At step S77 subsequent to the affirmative determination of step S15, controller 3 calculates a lane marker tracking time td by subtracting the lane departure time t from a target lane departure time td* (td=td*−t). After the execution of step S77, the routine proceeds to step S71. The other steps of FIG. 22 are the same as those of FIG. 20 and are denoted by the same reference numerals of FIG. 20.

With the thus arranged fifth embodiment according to the present invention, when the lane departure time t is elapsed after controller 3 detects that vehicle VE tends to depart from the lane, controller 3 executes the lane marker tracking control for corresponding controlled curvature $ρ_C$ of vehicle VE to the lane marker curvature ρ. Further, the lane marker tacking time td, during when the corresponded condition of controlled curvature $ρ_C$ with lane marker curvature ρ is maintained, is calculated by subtracting the lane departure time t from the target lane departure time td*. Accordingly, a time period from the detection of the lane departure tendency to the start of the steering returning control for gradually returning the target auxiliary steering angle θ* to zero, which time period corresponds to the time period to the real lane departure of vehicle VE, is always controlled at target lane departure time td*. Accordingly, the margin time for the driver's intervention to the steering operation is set at the constant target lane departure time td*. This setting enables the driver to certainly execute the steering intervention before the real lane departure of vehicle VE.

Figure 24:
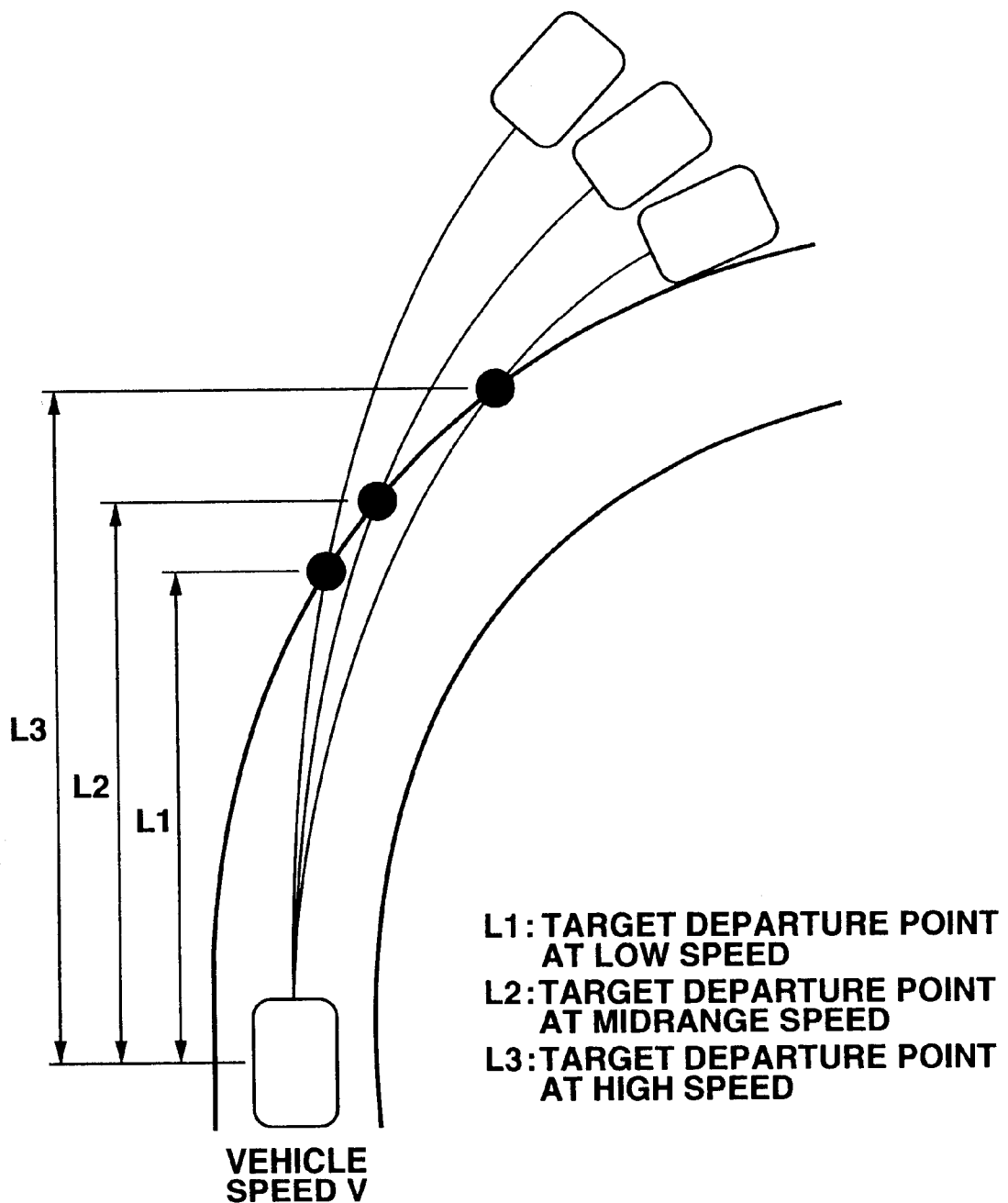
FIG. 24 is a view employed for explaining the lane tracking operation according to the vehicle speed executed in the third, fourth and fifth embodiments.

The third to fifth embodiments may be arranged to control the maximum value of controlled curvature $ρ_C$ at a value obtained by multiplying the lane marker curvature ρ by controlled curvature gain G which increases according to the increase of vehicle speed detection value V ($ρ_c$=ρ×G: G∝V), as is similar to that of the second embodiment, so that the target lane departure distance L is changed according to the vehicle speed detection value V as shown in FIG. 24.

Figure 25:
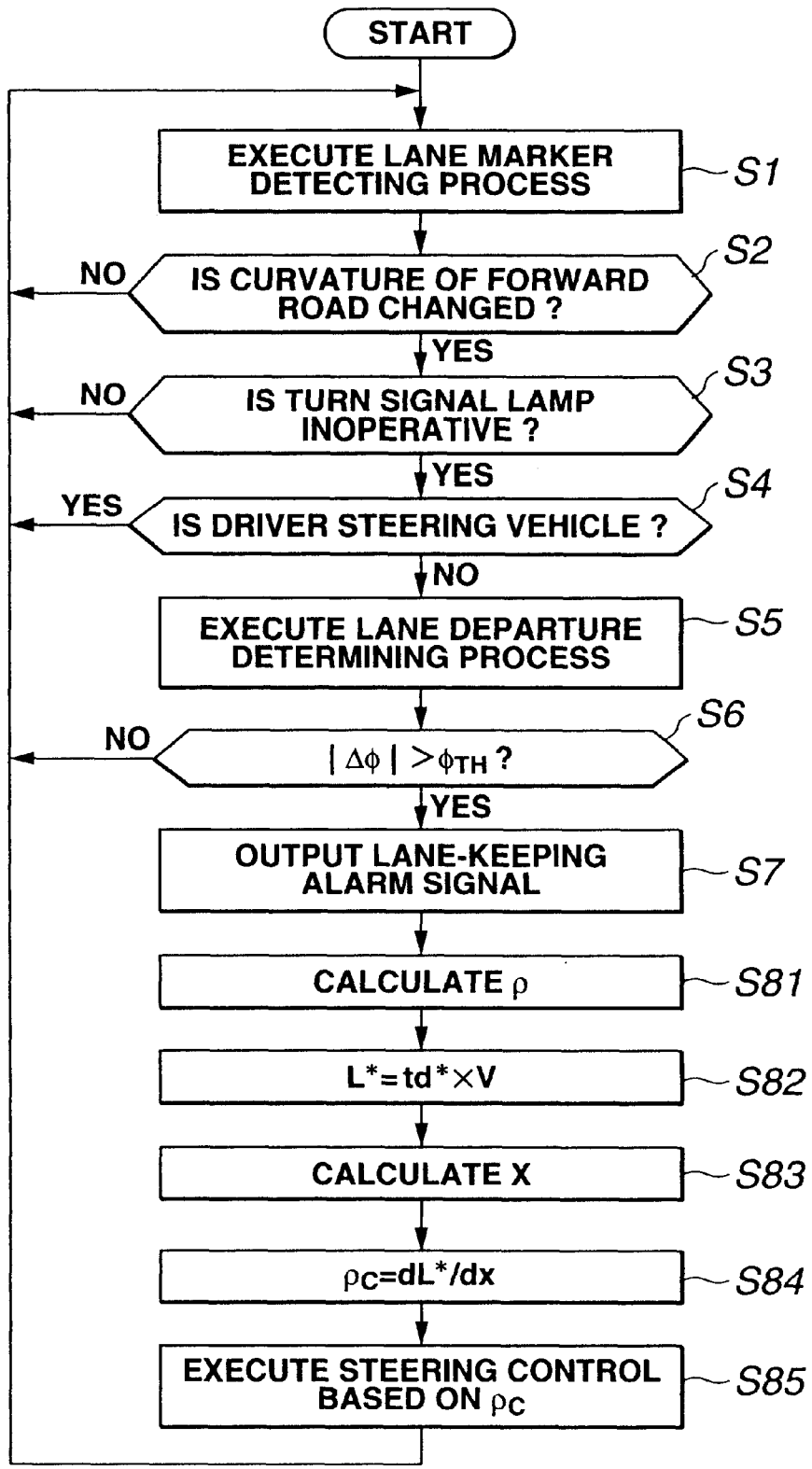
FIG. 25 is a flowchart showing the lane tracking control process employed in a sixth embodiment according to the present invention.
Figure 26:
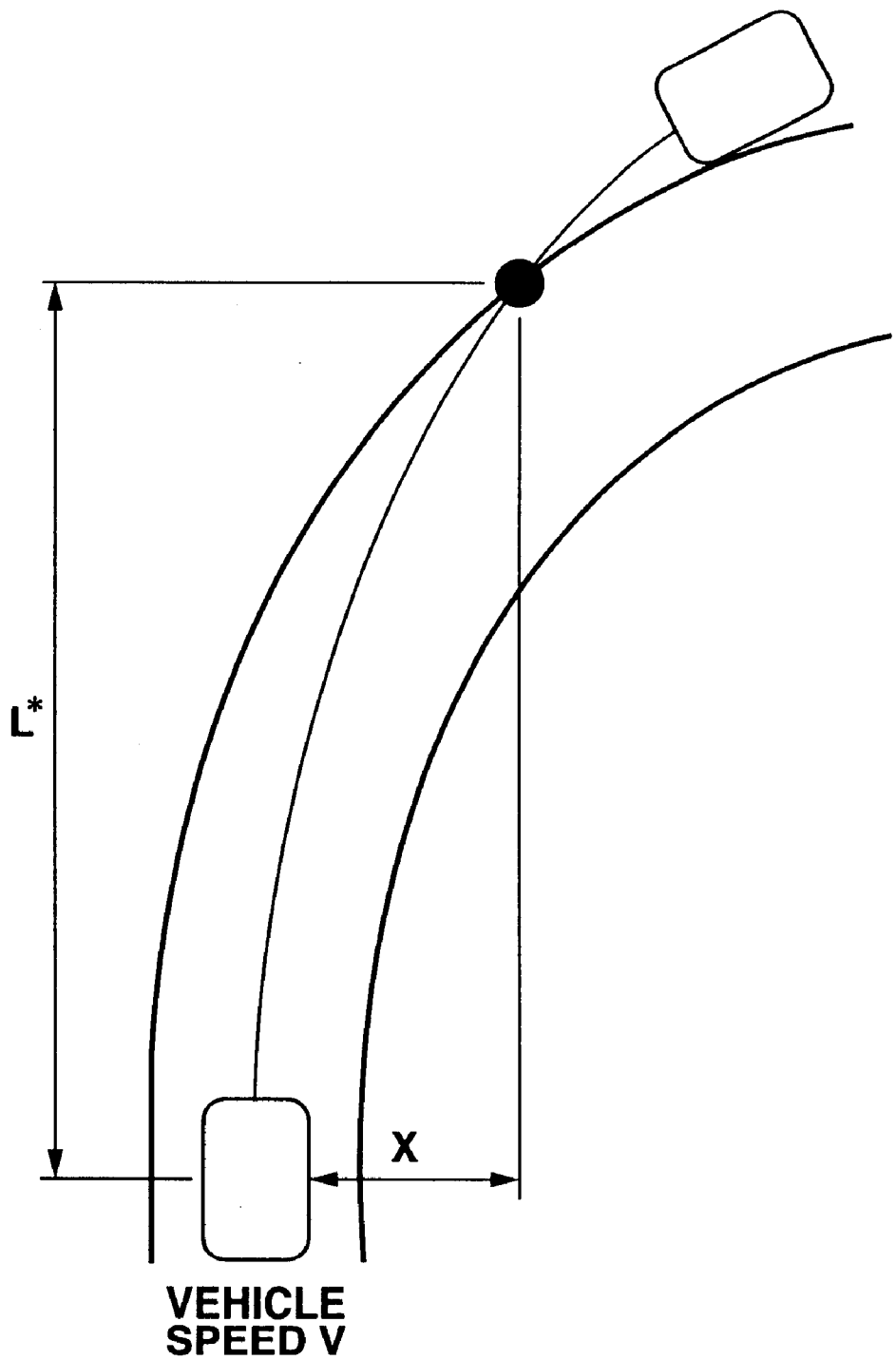
FIG. 26 is a view employed for explaining the lane tracking operation of the sixth embodiment.

Referring to FIGS. 25 and 26, there is shown a sixth embodiment of the lane tracking control system S according to the present invention. The basic construction of the sixth embodiment is the same as the construction of the first embodiment shown in FIG. 1.

The sixth embodiment is specially arranged to set a lane departure distance so as to maintain the target lane departure time td* and to control controlled curvature $ρ_C$ so that vehicle VE departs from the lane at the lane departure distance. More specifically, as shown in FIG. 25, the lane tracking control process of the sixth embodiment is based on the flowchart of FIG. 3 and comprises steps S81 to S85 instead of steps S8 to S20 of FIG. 3.

At step S81 subsequent to the execution of step S7, controller 3 calculates lane marker curvature ρ at the present lane departure point.

At step S82, controller 3 calculates target lane departure distance L* by multiplying td* by vehicle speed detection value V (L*=td*×V).

At step S83, controller 3 calculates lane departure point P ahead of vehicle VE by target lane departure distance L* from image information as shown in FIG. 12 and calculates lateral displacement x at lane departure point P relative to the present position of vehicle VE.

At step S84, controller 3 calculates controlled curvature $ρ_C$ by differentiating target lane departure distance L* with respect to lateral displacement x ($ρ_c$=dL*/dx).

At step S85, controller 3 calculates target auxiliary steering angle θ* corresponding to the calculated controlled curvature $ρ_C$ and executes the steering control process for outputting target auxiliary steering angle θ* to auxiliary steering mechanism 7. Thereafter, the routine of FIG. 25 returns to step S1. The other steps of FIG. 25 are the same as those of FIG. 3 and are denoted by the same reference numerals of FIG. 3. Therefore, the explanation of the other steps is omitted herein.

With the thus arranged sixth embodiment, target lane departure distance L* is calculated by multiplying target lane departure time td* by vehicle speed detection value V at the time when the lane departure tendency is detected, and lane departure point P, which is located on the lane marker and ahead of vehicle VE by target lane departure distance L* is obtained. Further, lateral displacement x of lane departure point P relative to the present position of vehicle VE is obtained. Controlled curvature $ρ_C$ is calculated by differentiating target lane departure distance L* by lateral displacement x. Auxiliary steering mechanism 7 is controlled on the basis of controlled curvature $\rho_C$ so that vehicle VE departs from the lane at the point on the lane marker ahead of vehicle VE by target lane departure distance L*. Therefore, it is possible to accurately correspond the lane departure time from the detection of the lane departure tendency to the real lane departure at target lane departure time td* regardless the vehicle speed. This facilitates the lane departure avoidance operation executed by the driver's steering operation.

Although the first to sixth embodiments according to the present invention have been shown and described as the threshold $\phi_{TH}$ for determining the lane departure is set at a fixed value, the present invention is not limited to this and may be arranged such that the threshold $\phi_{TH}$ is increased according to the increase of vehicle speed detection value V. By this arrangement of the variable threshold $\phi_{TH}$, the time period until the lane departure is shortened by the increase of vehicle speed detection value V, and therefore it becomes possible to early detect the lane departure.

While the first to sixth embodiments according to the present invention have been shown and described such that the lane tracking control system S according to the present invention employs yaw rate sensor 4 as a turn condition detecting means, it will be understood that a steering angle sensor may be provided instead of the yaw rate sensor 4 and the real yaw rate is estimated on the basis of the steering angle detected by the steering angle sensor and the vehicle speed V detected by vehicle speed sensor 4.

Further, a lateral acceleration may be employed instead of the yaw rate. In such a case of employing the lateral acceleration as a turn condition indicative information, a necessary lateral acceleration $Y_{G\text{-}NEED}$, by which vehicle VE reaches the center of the lane from the lateral displacement XL1 at the fixation point, is calculated from the following equation (5).

$$Y_{G\text{-}NEED}=(2\times XL1\times V\times V)/(L1\times L1) \quad (5)$$

Further, when a lateral acceleration sensor is employed instead of yaw rate sensor 4 and when an absolute value of a difference between the lateral acceleration detected by the lateral acceleration sensor and the necessary lateral acceleration $Y_{G\text{-}NEED}$ calculated by the equation (5) becomes greater than a preset threshold $Y_{G\text{-}TH}$, controller 3 determines that there is a tendency of the lane departure of vehicle VE and commands alarm 6 to generate alarm.

Further, by setting the threshold $Y_{G\text{-}TH}$ according to the vehicle speed V so that the threshold $Y_{G\text{-}TH}$ decreases according to the increase of the vehicle speed V, it becomes possible to certainly generate alarm before vehicle VE departs from the lane even if vehicle VE travels at high speed. Furthermore, the steering angle sensor may be employed instead of the lateral acceleration sensor so that the lateral acceleration is estimated from a steering angle detected by the steering angle sensor and the vehicle speed V detected by vehicle speed sensor 5.

Although the first to sixth embodiments have been shown and described such that the center portion of the two model lane markers is defines as a fixation point A and that controller 3 calculates the yaw rate necessary that vehicle VE reaches the fixation point A, it will be understood that the present invention is not limited to this and that the fixation point may be set at a point to which vehicle VE can travel without departing from the lane.

Although the first to sixth embodiments have been shown and described such that controller 3 detects the lane markers by processing the image information taken by camera 1, it will be understood that the present invention is not limited to this and may be arranged to obtain the road curvature by receiving road information including the road curvature from transmitters which are disposed near the road and transmit the road information. Furthermore, if vehicle VE is equipped with a navigation system including a GPS, controller 3 may automatically receive the road curvature of the road ahead of vehicle VE from the navigation system which can output the road curvature from the map information and the present position of vehicle VE. That is, the road curvature detecting means is not limited to the above disclosure and may be any one which can detect the road shape ahead of vehicle VE.

This application is based on a prior Japanese Patent Application No. 2001-10650 filed on Jan. 18, 2001 in Japan. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane tracking control system for a vehicle, comprising:
   a road image detector taking a view ahead of the vehicle;
   a vehicle behavior detector detecting a behavior of the vehicle;
   a steering control mechanism executing a steering control in response to a steering control signal; and
   a controller coupled to the road image sensor, the vehicle behavior detector and the steering control mechanism, the controller being arranged,
   to calculate a road shape on the basis of the view taken by the road image detector,
   to determine whether the vehicle tends to depart from a lane traveled by the vehicle, on the basis of the road shape and the vehicle behavior detected by the vehicle behavior detector,
   to output the steering control signal to the steering control mechanism to control the vehicle behavior at a desired behavior when the vehicle tends to depart from the lane,
   wherein the vehicle behavior detector comprises a steering torque sensor, a turn signal lamp, a vehicle speed sensor and a yaw rate sensor.

2. The lane tracking control system as claimed in claim 1, wherein the controller outputs the steering control signal to the steering control mechanism so that a vehicle traveling locus calculated from the vehicle behavior gradually approaches the road shape when the vehicle tends to depart from the lane.

3. The lane tracking control system as claimed in claim 1, wherein the controller outputs the steering control signal to the steering control mechanism so as to increase a lane departure time period between a first moment of determining that the vehicle tends to depart from the lane and a second moment of a real lane departure of the vehicle when the vehicle tends to depart from the lane.

4. The lane tracking control system as claimed in claim 1, wherein the controller outputs the steering control signal to the steering control mechanism so that a steering control parameter employed for controlling the steering control mechanism is gradually varied.

5. The lane tracking control system as claimed in claim 3, wherein the controller determines a lane departure point, at which the vehicle departs from the lane, so that the lane departure time period takes a constant value.

6. The lane tracking control system as claimed in claim 1, wherein the road image detector comprises a camera which takes a view ahead of the vehicle and an image processor which processes the view into lane-marker indicative information, and the controller calculates a curvature of the lane of the road ahead of the vehicle from the lane-marker indicative information.

7. The lane tracking control system as claimed in claim 4, further comprising a vehicle speed detector for detecting a speed of the vehicle, the controller calculating a gain which increases according to an increase of the speed of the vehicle, and calculates the steering control parameter by multiplying a target turn degree of the vehicle by the gain.

8. The lane tracking control system as claimed in claim 2, further comprising a vehicle speed detector for detecting a speed of the vehicle, the controller outputs the steering control signal to the steering control mechanism so that a curvature of the vehicle traveling locus is increased according to the increase of the speed of the vehicle.

9. The lane tracking control system as claimed in claim 3, wherein the controller outputs the steering control signal to the steering control mechanism so that a curvature of a vehicle traveling locus calculated from the vehicle behavior is decreased after the curvature of the vehicle traveling locus reaches a target curvature.

10. The lane tracking control system as claimed in claim 2, wherein the controller outputs the steering control signal to the steering control mechanism so that the curvature of the vehicle traveling locus is gradually decreased after a predetermined time elapsed from a moment that the curvature of the vehicle traveling locus corresponds to a curvature of the lane.

11. A lane tracking control system for a vehicle, comprising:
a road image detector taking a view ahead of the vehicle;
a vehicle behavior detector detecting a behavior of the vehicle;
a steering control mechanism executing a steering control in response to a steering control signal; and
a controller coupled to the road image sensor, the vehicle behavior detector and the steering control mechanism, the controller being arranged,
to calculate a road shape on the basis of the view taken by the road image detector,
to determine whether the vehicle tends to depart from a lane traveled by the vehicle, on the basis of the road shape and the vehicle behavior detected by the vehicle behavior detector,
to output the steering control signal to the steering control mechanism to control the vehicle behavior at a desired behavior when the vehicle tends to depart from the lane,
wherein the vehicle behavior detector comprises a steering angle detector for detecting a steering angle of the vehicle, a yaw angle detector for detecting a yaw angle of the vehicle and a lateral displacement detector for detecting a lateral displacement of the vehicle relative to a center of the lane.

12. The lane tracking control system as claimed in claim 11, wherein the controller outputs the steering control signal to the steering control mechanism so that a vehicle traveling locus calculated from the vehicle behavior gradually approaches the road shape when the vehicle tends to depart from the lane.

13. The lane tracking control system as claimed in claim 11, wherein the controller outputs the steering control signal to the steering control mechanism so as to increase a lane departure time period between a first moment of determining that the vehicle tends to depart from the lane and a second moment of a real lane departure of the vehicle when the vehicle tends to depart from the lane.

14. The lane tracking control system as claimed in claim 11, wherein the controller outputs the steering control signal to the steering control mechanism so that a steering control parameter employed for controlling the steering control mechanism is gradually varied.

15. The lane tracking control system as claimed in claim 13, wherein the controller determines a lane departure point, at which the vehicle departs from the lane, so that the lane departure time period takes a constant value.

16. The lane tracking control system as claimed in claim 11, wherein the road image detector comprises a camera which takes a view ahead of the vehicle and an image processor which processes the view into lane-marker indicative information, and the controller calculates a curvature of the lane of the road ahead of the vehicle from the lane-marker indicative information.

17. The lane tracking control system as claimed in claim 11, further comprising a vehicle speed detector for detecting a speed of the vehicle, the controller calculating a gain which increases according to an increase of the speed of the vehicle, and calculates the steering control parameter by multiplying a target turn degree of the vehicle by the gain.

18. The lane tracking control system as claimed in claim 11, further comprising a vehicle speed detector for detecting a speed of the vehicle, the controller outputs the steering control signal to the steering control mechanism so that a curvature of the vehicle traveling locus is increased according to the increase of the speed of the vehicle.

19. The lane tracking control system as claimed in claim 13, wherein the controller outputs the steering control signal to the steering control mechanism so that a curvature of a vehicle traveling locus calculated from the vehicle behavior is decreased after the curvature of the vehicle traveling locus reaches a target curvature.

20. A lane tracking control system for a vehicle, comprising:
road shape detecting means for detecting a shape of a road ahead of the vehicle;
turn degree detecting means for detecting a degree of a turn of the vehicle;
lane departure determining means for determining whether the vehicle tends to depart from a lane of the road ahead of the vehicle; and
steering control means for executing a steering control of the vehicle so as to elongate a lane departure time period between a first moment of determining that the vehicle tends to depart from the lane and a second moment of a real lane departure of the vehicle.

* * * * *